(12) United States Patent
Huang

(10) Patent No.: US 9,235,032 B1
(45) Date of Patent: Jan. 12, 2016

(54) PHOTOGRAPHING OPTICAL LENS, IMAGE CAPTURING DEVICE AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/461,491

(22) Filed: Aug. 18, 2014

(30) Foreign Application Priority Data

Jul. 1, 2014 (TW) .............................. 103122671 A

(51) Int. Cl.
*G02B 13/00* (2006.01)
*G02B 9/62* (2006.01)
*G02B 13/18* (2006.01)

(52) U.S. Cl.
CPC .............. *G02B 13/0045* (2013.01); *G02B 9/62* (2013.01); *G02B 13/18* (2013.01)

(58) Field of Classification Search
CPC ............. G02B 13/0015; G02B 13/002; G02B 13/0045; G02B 9/62
USPC .......................................... 359/713, 754–757
See application file for complete search history.

(56) References Cited

U.S. PATENT DOCUMENTS

| 8,335,043 | B2 | 12/2012 | Huang |
| 8,432,619 | B2 | 4/2013 | Huang |
| 8,867,149 | B2 | 10/2014 | Hsu et al. |
| 2012/0188654 | A1* | 7/2012 | Huang ........................... 359/713 |
| 2013/0003193 | A1* | 1/2013 | Huang ........................... 359/713 |
| 2013/0242362 | A1 | 9/2013 | Nakayama et al. |
| 2015/0062406 | A1 | 3/2015 | Chen et al. |

FOREIGN PATENT DOCUMENTS

| CN | 103676107 A | 3/2014 |
| CN | 204302563 U | 4/2015 |
| CN | 204422851 U | 6/2015 |
| CN | 204422854 U | 6/2015 |
| JP | 2013-054294 | 3/2013 |
| JP | 2013-182090 | 9/2013 |
| JP | 2014-013293 | 1/2014 |
| TW | 201331617 A | 8/2013 |
| WO | 2012-169778 | 12/2012 |

* cited by examiner

*Primary Examiner* — Bumsuk Won
*Assistant Examiner* — William R Alexander
(74) *Attorney, Agent, or Firm* — McClure, Qualey & Rodack, LLP

(57) ABSTRACT

A photographing optical lens includes, in order from an object side to an image side, a first lens element, a second lens element, a third lens element, a fourth lens element, a fifth lens element and a sixth lens element. The first lens element has positive refractive power. The second lens element, the third lens element, and the fourth lens element have refractive power. The fifth lens element with negative refractive power has an aspheric object-side surface and an aspheric image-side surface being concave in a paraxial region thereof. The sixth lens element with negative refractive power has an aspheric object-side surface being concave in a paraxial region thereof and an aspheric image-side surface being concave in a paraxial region thereof, wherein the image-side surface thereof has at least one inflection point. The photographing optical lens further includes a stop located between an object and the second lens element.

31 Claims, 17 Drawing Sheets

PHOTOGRAPHING OPTICAL LENS, IMAGE CAPTURING DEVICE AND ELECTRONIC DEVICE

RELATED APPLICATIONS

This application claims priority to Taiwan Application Serial Number 103122671, filed Jul. 1, 2014, which is herein incorporated by reference.

BACKGROUND

1. Technical Field

The present disclosure relates to a photographing optical lens. More particularly, the present disclosure relates to a compact photographing optical lens applicable to electronic devices.

2. Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure or a five-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with six-element lens structure are disclosed. However, the refractive power and the surface shape of the lens elements are not favorable for enhancing the diverging ability at the image side and reducing the back focal length of the optical system. Furthermore, the converging intensity at the optical axis cannot be moderated for enhancing the image sharpness. Accordingly, it is not favorable for keeping the optical system compact and enhancing the image quality.

SUMMARY

According to one aspect of the present disclosure, a photographing optical lens includes, in order from an object side to an image side, a first lens element, a second lens element, a third lens element, a fourth lens element, a fifth lens element and a sixth lens element. The first lens element has positive refractive power. The second lens element has refractive power. The third lens element has refractive power. The fourth lens element has refractive power. The fifth lens element with negative refractive power has an image-side surface being concave in a paraxial region thereof. An object-side surface and the image-side surface of the fifth lens element are aspheric. The sixth lens element with negative refractive power has an object-side surface being concave in a paraxial region thereof and an image-side surface being concave in a paraxial region thereof. The object-side surface and the image-side surface of the sixth lens element are aspheric, and the image-side surface of the sixth lens element has at least one inflection point. The photographing optical lens has a total of six lens elements with refractive power. The photographing optical lens further includes a stop, and the stop is located between an object and the second lens element. When a focal length of the photographing optical lens is f, a focal length of the fifth lens element is f5, a focal length of the sixth lens element is f6, a curvature radius of an image-side surface of the third lens element is R6, a curvature radius of the image-side surface of the fifth lens element is R10, and a curvature radius of the object-side surface of the sixth lens element is R11, the following relationships are satisfied:

$f5<f6<0$;

$R11<0<R10$; and $-2.0<f/R6<0.60$.

According to another aspect of the present disclosure, a photographing optical lens includes, in order from an object side to an image side, a first lens element, a second lens element, a third lens element, a fourth lens element, a fifth lens element and a sixth lens element. The first lens element has positive refractive power. The second lens element has refractive power. The third lens element has refractive power. The fourth lens element has refractive power. The fifth lens element with negative refractive power has an image-side surface being concave in a paraxial region thereof. An object-side surface and the image-side surface of the fifth lens element are aspheric. The sixth lens element with negative refractive power has an object-side surface being concave in a paraxial region thereof and an image-side surface being concave in a paraxial region thereof. The object-side surface and the image-side surface of the sixth lens element are aspheric, and the image-side surface of the sixth lens element has at least one inflection point. The photographing optical lens has a total of six lens elements with refractive power, and each of the first lens element, the second lens element, the third lens element, the fourth lens element, the fifth lens element and the sixth lens element is a single and non-cemented lens element. When a focal length of the photographing optical lens is f, a focal length of the fifth lens element is f5, a focal length of the sixth lens element is f6, a curvature radius of an object-side surface of the second lens element is R3, a curvature radius of the image-side surface of the fifth lens element is R10, a curvature radius of the object-side surface of the sixth lens element is R11, and a curvature radius of the image-side surface of the sixth lens element is R12, the following relationships are satisfied:

$f5<f6<0$;

$R11<0<R10$;

$-0.45<f/R3$; and $-0.30<(R11+R12)/(R11-R12)<1.0$.

According to yet another aspect of the present disclosure, an image capturing device includes the aforementioned photographing optical lens and an image sensor. The image sensor is located at the image side of the photographing optical lens.

According to yet another aspect of the present disclosure, an electronic device includes the aforementioned image capturing device.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
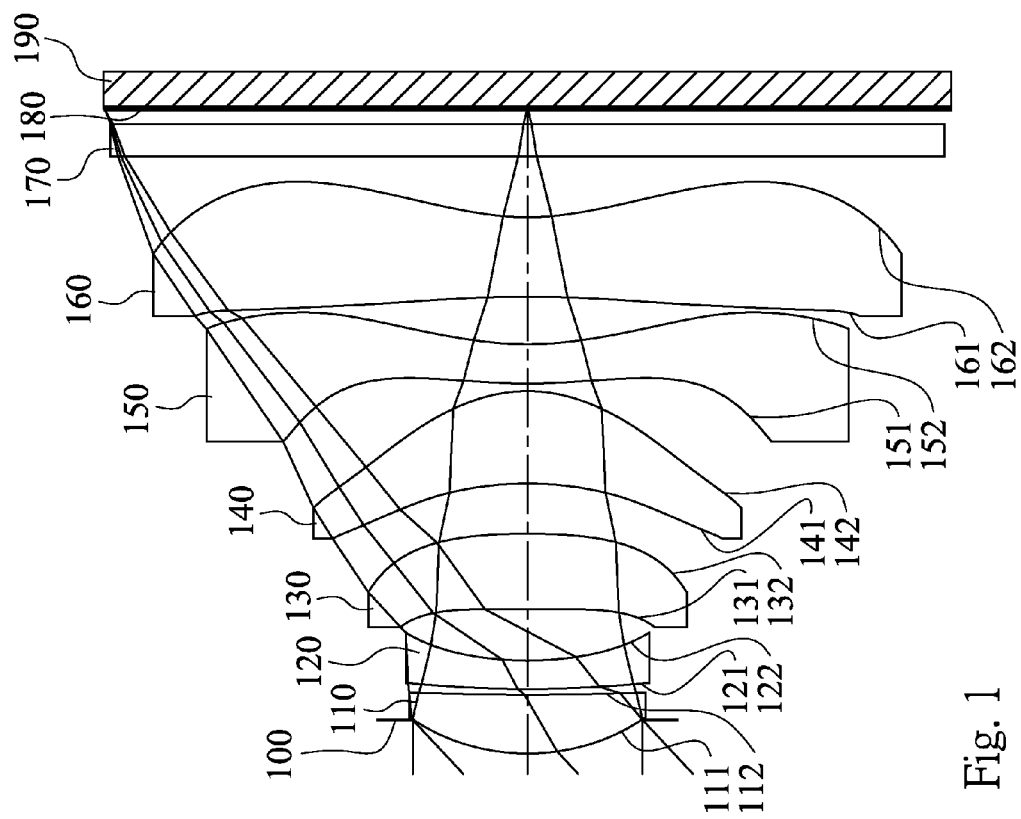
FIG. 1 is a schematic view of an image capturing device according to the 1st embodiment of the present disclosure.

A photographing optical lens includes, in order from an object side to an image side, a first lens element, a second lens element, a third lens element, a fourth lens element, a fifth lens element and a sixth lens element. The photographing optical lens has a total of six lens elements with refractive power.

Each of the first lens element, the second lens element, the third lens element, the fourth lens element, the fifth lens element and the sixth lens element is a single and non-cemented lens element. That is, there is an air gap in a paraxial region between any two lens elements of the first lens element, the second lens element, the third lens element, the fourth lens element, the fifth lens element and the sixth lens element adjacent to each other. Moreover, the manufacturing process of the cemented lens elements is more complex than the non-cemented lens elements. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the photographing optical lens. Therefore, the photographing optical lens of the present disclosure provides six single and non-cemented lens elements for improving the problem generated by the cemented lens elements.

The first lens element has positive refractive power, so that the total track length of the photographing optical lens can be reduced.

The second lens element can have negative refractive power, and can have an object-side surface being convex in a paraxial region thereof and an image-side surface being concave in a paraxial region thereof. Therefore, the aberration of the photographing optical lens can be effectively corrected.

The third lens element can have positive refractive power. Therefore, the distribution of the positive refractive power of the photographing optical lens can be balanced so as to reduce the photosensitivity thereof, and the astigmatism can be corrected.

The fourth lens element can have positive refractive power, and can have an object-side surface being concave in a paraxial region thereof and an image-side surface being convex in a paraxial region thereof. Therefore, the astigmatism and the spherical aberration of photographing optical lens can be effectively corrected.

The fifth lens element with negative refractive power can have an object-side surface being convex in a paraxial region thereof, and has an image-side surface being concave in a paraxial region thereof. Therefore, the Petzval sum of the photographing optical lens can be effectively corrected, and the flatness of the image can be enhanced. Furthermore, the image-side surface of the fifth lens element can have at least one convex shape in an off-axis region thereof, so that the incident angle of the off-axis field onto an image sensor can be effectively reduced, and the photosensitivity of the photographing optical lens can be improved.

The sixth lens element has negative refractive power which can be coordinated with the negative refractive power of the fifth lens element for enhancing the diverging ability at the image side of the photographing optical lens, so that the back focal length and the total track length of the photographing optical lens can be reduced. The sixth lens element has an object-side surface being concave in a paraxial region thereof and an image-side surface being concave in a paraxial region thereof. Due to the fifth lens element has the image-side surface being concave in the paraxial region thereof at the same time, the converging intensity at the optical axis can be moderated so as to reduce the converging range of the chief ray of the center field and the marginal ray. As a result, the spherical aberration of photographing optical lens can be corrected, and the image sharpness can be enhanced. Furthermore, the image-side surface of the sixth lens element can have at least one inflection point for further correcting the aberration of the off-axis field, and the image quality can be enhanced.

When a focal length of the fifth lens element is f5, and a focal length of the sixth lens element is f6, the following relationship is satisfied: $f5<f6<0$. Therefore, the diverging ability at the image side of the photographing optical lens can be enhanced for reducing the back focal length and the total track length of the photographing optical lens.

When a curvature radius of the image-side surface of the fifth lens element is R10, and a curvature radius of the object-side surface of the sixth lens element is R11, the following relationship is satisfied: $R11<0<R10$. Therefore, the converging intensity at the optical axis can be moderated so as to reduce the converging range of the chief ray of the center field and the marginal ray. As a result, the spherical aberration of photographing optical lens can be corrected, and the image sharpness can be enhanced.

When a focal length of the photographing optical lens is f, and a curvature radius of an image-side surface of the third lens element is R6, the following relationship is satisfied: $-2.0<f/R6<0.60$. Therefore, the astigmatism and the spherical aberration of photographing optical lens can be effectively corrected so as to enhance the image quality. Preferably, the following relationship can be satisfied: $-2.0<f/R6<-0.45$.

The photographing optical lens can further include a stop, such as an aperture stop. The stop is located between an object and the second lens element. Therefore, the telecentricity and the wide-angle character of the photographing optical lens can be balanced.

When the focal length of the photographing optical lens is f, and a curvature radius of the object-side surface of the second lens element is R3, the following relationship is satisfied: $-0.45<f/R3$. Therefore, the aberration of the photographing optical lens can be corrected, and the high image quality can be maintained. Preferably, the following relationship can be satisfied: $0.15<f/R3$.

When the curvature radius of the object-side surface of the sixth lens element is R11, and a curvature radius of the image-side surface of the sixth lens element is R12, the following relationship is satisfied: $-0.30<(R11+R12)/(R11-R12)<1.0$. Therefore, the converging intensity at the optical axis can be moderated so as to reduce the converging range of the chief ray of the center field and the marginal ray. As a result, the spherical aberration of photographing optical lens can be corrected, and the image sharpness can be enhanced. Preferably, the following relationship can be satisfied: $0<(R11+R12)/(R11-R12)<1.0$.

When an axial distance between the stop and the image-side surface of the sixth lens element is SD, and an axial distance between an object-side surface of the first lens element and the image-side surface of the sixth lens element is TD, the following relationship can be satisfied: $0.85<SD/TD<1.2$. Therefore, the telecentricity and the wide-angle character of the photographing optical lens can be balanced.

When a curvature radius of the object-side surface of the fifth lens element is R9, and the curvature radius of the image-side surface of the fifth lens element is R10, the following relationship can be satisfied: $0<(R9-R10)/(R9+R10)<2.0$. Therefore, the Petzval sum of the photographing optical lens can be effectively corrected, and the flatness of the image can be enhanced.

When the focal length of the fifth lens element is f5, and the focal length of the sixth lens element is f6, the following relationship can be satisfied: $0.05<f6/f5<0.60$. Therefore, the diverging ability at the image side of the photographing optical lens can be enhanced for reducing the back focal length and the total track length of the photographing optical lens.

When a focal length of the third lens element is f3, and a focal length of the fourth lens element is f4, the following relationship can be satisfied: $-1.0<f4/f3<1.0$. Therefore, the distribution of the positive refractive power of the photographing optical lens can be balanced so as to reduce the sensitivity thereof, and the astigmatism can be corrected.

The negative refractive power of the sixth lens element can be stronger than the negative refractive power of other lens elements with negative refractive power of the photographing optical lens. Therefore, the spherical aberration of photographing optical lens can be corrected, and the image sharpness can be enhanced.

When an axial distance between the object-side surface of the first lens element and an image surface is TL, and a maximum image height of the photographing optical lens is ImgH, the following relationship can be satisfied: $TL/ImgH<1.90$. Therefore, the compact size of the photographing optical lens can be maintained for applying to thin and portable electronics.

When an Abbe number of the second lens element is V2, an Abbe number of the fifth lens element is V5, and an Abbe number of the sixth lens element is V6, the following relationship can be satisfied: $0.40<(V2+V5)/V6<0.90$. Therefore, the chromatic aberration of the photographing optical lens can be corrected.

When the focal length of the photographing optical lens is f, and the focal length of the third lens element is f3, the following relationship can be satisfied: $0.35<f/f3$. Therefore, the distribution of the positive refractive power of the photographing optical lens can be balanced so as to reduce the sensitivity thereof, and the astigmatism can be corrected.

When a central thickness of the third lens element is CT3, and a central thickness of the fourth lens element is CT4, the following relationship can be satisfied: $0.80<CT3/CT4$. Therefore, the moldability and homogeneity of the lens elements can be enhanced.

According to the photographing optical lens of the present disclosure, an image surface of the photographing optical lens, based on the corresponding image sensor, can be flat or curved. For instance, the image surface can be a curved surface being concave facing towards the object side.

According to the photographing optical lens of the present disclosure, the lens elements thereof can be made of glass or plastic material. When the lens elements are made of glass material, the distribution of the refractive powers of the photographing optical lens may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens can also be reduced.

According to the photographing optical lens of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the photographing optical lens of the present disclosure, the photographing optical lens can include at least one stop, such as an aperture stop, a glare stop or a field stop. Said glare stop or said field stop is for eliminating the stray light and thereby improving the image resolution thereof. According to the photographing optical lens of the present disclosure, an aperture stop can be configured as a front stop or a middle stop. A front stop disposed between an imaged object and the first lens element can provide a longer distance between an exit pupil of the wide-angle image capturing lens assembly and the image surface and thereby improves the image-sensing efficiency of an image sensor. A middle stop disposed between the first lens element and the image surface is favorable for enlarging the field of view of the photographing optical lens and thereby provides a wider field of view for the same.

According to the photographing optical lens of the present disclosure, the photographing optical lens can be optionally applied to moving focus optical systems, and is featured with good ability for correcting aberration and high image quality. The photographing optical lens of the present disclosure also can be applied to 3D (three-dimensional) image capturing applications, in products such as digital cameras, mobile devices, digital tablets, smart TV, internet monitoring device, game consoles with motion sensing function, driving recording systems, rear view camera systems, and wearable devices.

According to the present disclosure, an image capturing device is provided. The image capturing device includes the aforementioned photographing optical lens and an image sensor. The image sensor is located at the image side of the photographing optical lens, that is, the image sensor can be located on or near an image surface of the aforementioned photographing optical lens. The fifth lens element and the sixth lens element have negative refractive power, so that the diverging ability at the image side of the photographing optical lens can be enhanced. Accordingly, the back focal length and the total track length of the photographing optical lens can be reduced, and the compact size of the photographing optical lens can be maintain. The converging intensity at the optical axis can be moderated via the shapes of the fifth lens element and the sixth lens element, so that the converging range of the chief ray of the center field and the marginal ray can be reduced. As a result, the spherical aberration of photographing optical lens can be corrected, the image sharpness can be enhanced, and the image quality can be enhanced. Preferably, the image capturing device can further include a barrel member, a holding member or a combination thereof.

According to the present disclosure, an electronic device is provided. The electronic device includes the aforementioned image capturing device. Therefore, the image sharpness can be enhanced while the compact size of the electronic device is maintained. Preferably, the electronic device can further include but not limited to a control unit, a display, a storage unit, a random access memory unit (RAM), a read only memory unit (ROM) or a combination thereof.

According to the above description of the present disclosure, the following 1st-10th specific embodiments are provided for further explanation.

1st Embodiment

Figure 2:
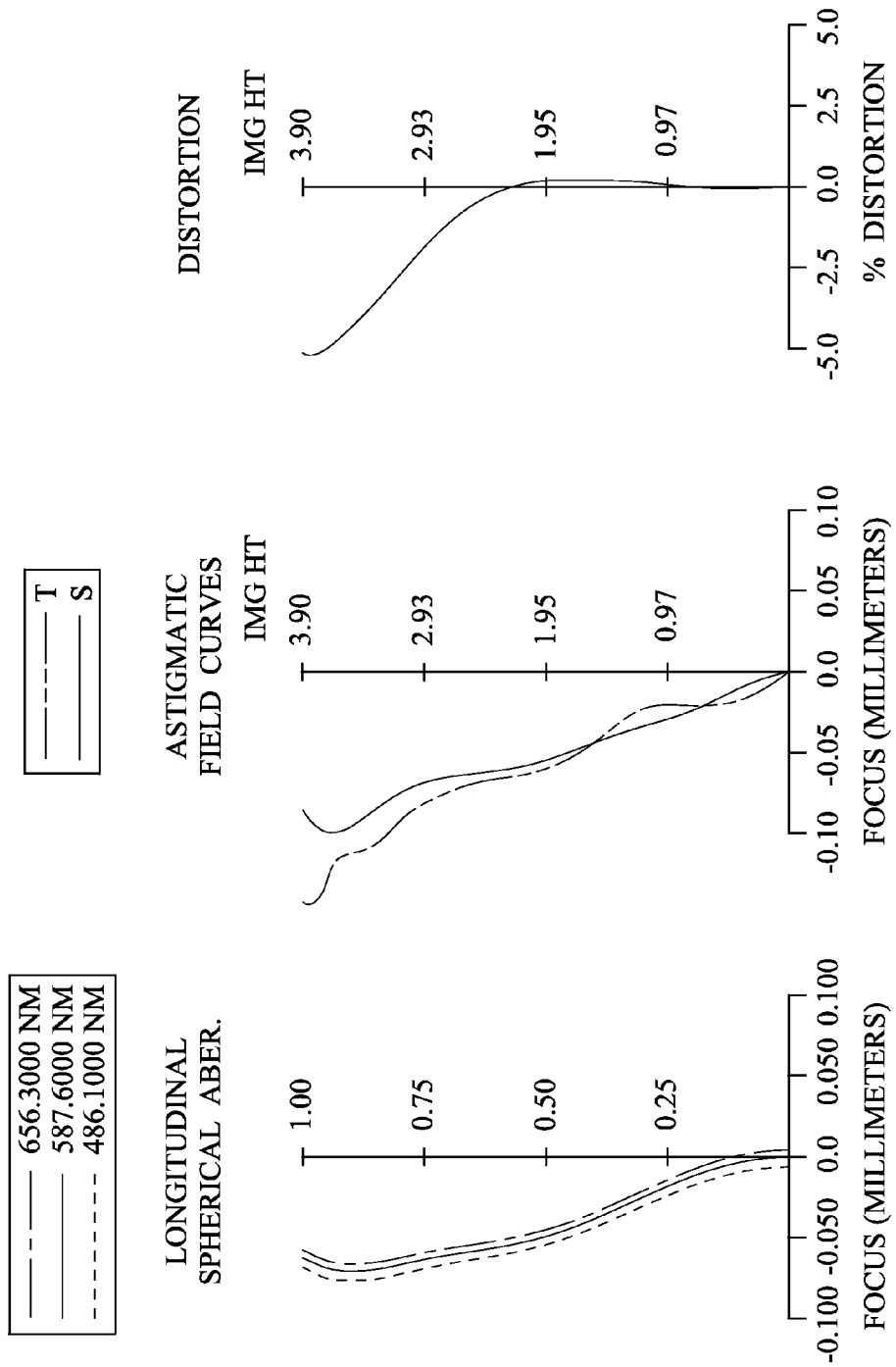
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes a photographing optical lens (its reference numeral is omitted) and an image sensor 190. The photographing optical lens includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image surface 180. The image sensor 190 is located on or near the image surface 180 of the photographing optical lens. The photographing optical lens has a total of six lens elements (110-160) with refractive power. Each of the first lens element 110, the second lens element 120, the third lens element 130, the fourth lens element 140, the fifth lens element 150 and the sixth lens element 160 is a single and non-cemented lens element.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. Furthermore, the image-side surface 152 of the fifth lens element 150 has a convex shape in an off-axis region thereof.

The sixth lens element 160 with negative refractive power has an object-side surface 161 being concave in a paraxial region thereof and an image-side surface 162 being concave in a paraxial region thereof. The sixth lens element 160 is made of plastic material and has the object-side surface 161 and the image-side surface 162 being both aspheric. Furthermore, the image-side surface 162 of the sixth lens element 160 has at least one inflection point.

Moreover, the negative refractive power of the sixth lens element 160 is stronger than the negative refractive power of other lens elements with negative refractive power of the photographing optical lens. (The result is obtained from comparing the absolute values of the negative refractive power of the lens elements with negative refractive power. When the negative refractive power is stronger, the absolute value of the negative refractive power is larger. Similarly, when the negative refractive power is weaker, the absolute value of the negative refractive power is smaller.)

The IR-cut filter 170 is made of glass material and located between the sixth lens element 160 and the image surface 180, and will not affect a focal length of the photographing optical lens.

The equation of the aspheric surface profiles of the aforementioned lens elements of the 1st embodiment is expressed as follows:

$$X(Y) = (Y^2/R)/(1 + \operatorname{sqrt}(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens of the image capturing device according to the 1st embodiment, when the focal length of the photographing optical lens is f, an f-number of the photographing optical lens is Fno, and a half of a maximal field of view of the photographing optical lens is HFOV, these parameters have the following values: f=4.44 mm; Fno=2.10; and HFOV=43.0 degrees.

In the photographing optical lens of the image capturing device according to the 1st embodiment, when an Abbe number of the second lens element 120 is V2, an Abbe number of the fifth lens element 150 is V5, and an Abbe number of the sixth lens element 160 is V6, the following relationship is satisfied: (V2+V5)/V6=0.97.

In the photographing optical lens of the image capturing device according to the 1st embodiment, when a central thickness of the third lens element 130 is CT3, and a central thickness of the fourth lens element 140 is CT4, the following relationship is satisfied: CT3/CT4=0.82.

In the photographing optical lens of the image capturing device according to the 1st embodiment, when the focal length of the photographing optical lens is f, a curvature radius of the object-side surface 121 of the second lens element 120 is R3, and a curvature radius of the image-side surface 132 of the third lens element 130 is R6, the following relationships are satisfied: f/R3=0.49; and f/R6=−0.82.

In the photographing optical lens of the image capturing device according to the 1st embodiment, when a curvature radius of the object-side surface 151 of the fifth lens element 150 is R9, a curvature radius of the image-side surface 152 of the fifth lens element 150 is R10, a curvature radius of the object-side surface 161 of the sixth lens element 160 is R11, and a curvature radius of the image-side surface 162 of the sixth lens element 160 is R12, the following relationships are satisfied: (R9−R10)/(R9+R10)=0.30; and (R11+R12)/(R11−R12)=0.68.

In the photographing optical lens of the image capturing device according to the 1st embodiment, when the focal length of the photographing optical lens is f, and a focal length of the third lens element 130 is f3, the following relationship is satisfied: f/f3=0.43.

In the photographing optical lens of the image capturing device according to the 1st embodiment, when the focal length of the third lens element 130 is f3, and a focal length of the fourth lens element 140 is f4, the following relationship is satisfied: f4/f3=0.37.

In the photographing optical lens of the image capturing device according to the 1st embodiment, when a focal length of the fifth lens element 150 is f5, and a focal length of the sixth lens element 160 is f6, the following relationship is satisfied: f6/f5=0.34.

In the photographing optical lens of the image capturing device according to the 1st embodiment, when an axial distance between the aperture stop 100 and the image-side surface 162 of the sixth lens element 160 is SD, and an axial distance between the object-side surface 111 of the first lens element 110 and the image-side surface 162 of the sixth lens element 160 is TD, the following relationship is satisfied: SD/TD=0.94.

In the photographing optical lens of the image capturing device according to the 1st embodiment, when an axial distance between the object-side surface 111 of the first lens element 110 and an image surface 180 is TL, and a maximum image height of the photographing optical lens is ImgH (half of a diagonal length of an effective photosensitive area of the image sensor 190), the following relationship is satisfied: TL/ImgH=1.52.

The detailed optical data of the 1st embodiment are shown in Table 1 and the aspheric surface data are shown in Table 2 below.

TABLE 1

1st Embodiment
f = 4.44 mm, Fno = 2.10, HFOV = 43.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.312 | | | | |
| 2 | Lens 1 | 2.014 | ASP | 0.543 | Plastic | 1.535 | 56.3 | 3.96 |
| 3 | | 37.095 | ASP | 0.052 | | | | |
| 4 | Lens 2 | 9.110 | ASP | 0.260 | Plastic | 1.634 | 23.8 | −6.73 |
| 5 | | 2.874 | ASP | 0.476 | | | | |
| 6 | Lens 3 | −231.076 | ASP | 0.697 | Plastic | 1.535 | 56.3 | 10.42 |
| 7 | | −5.446 | ASP | 0.460 | | | | |
| 8 | Lens 4 | −3.324 | ASP | 0.853 | Plastic | 1.535 | 56.3 | 3.88 |
| 9 | | −1.391 | ASP | 0.070 | | | | |
| 10 | Lens 5 | 5.630 | ASP | 0.361 | Plastic | 1.583 | 30.2 | −11.62 |
| 11 | | 3.003 | ASP | 0.438 | | | | |
| 12 | Lens 6 | −13.351 | ASP | 0.733 | Plastic | 1.535 | 55.7 | −3.90 |
| 13 | | 2.524 | ASP | 0.560 | | | | |
| 14 | IR-cut filter | Plano | | 0.300 | Glass | 1.517 | 64.2 | — |
| 15 | | Plano | | 0.144 | | | | |
| 16 | Image | Plano | | — | | | | |

Note:
Reference wavelength is 587.6 nm (d-line).

TABLE 2

Aspheric Coefficients

| Surface # | 2 | 3 | 4 | 5 | 6 | 7 |
|---|---|---|---|---|---|---|
| k = | −1.9368E+00 | −1.0000E+01 | 3.0000E+00 | −1.0078E+01 | 3.0000E+00 | 8.0014E−01 |
| A4 = | 4.1179E−02 | −1.1679E−02 | −4.4564E−02 | 2.7770E−02 | −4.5648E−02 | −3.8164E−02 |
| A6 = | −5.4508E−03 | 3.6048E−02 | 8.2701E−02 | 3.8648E−02 | −1.1339E−02 | −4.6126E−03 |

TABLE 2-continued

Aspheric Coefficients

| A8 = | 1.1242E−02 | −2.0955E−02 | −8.5929E−02 | −3.4610E−02 | −1.1417E−02 | −5.1216E−03 |
|---|---|---|---|---|---|---|
| A10 = | −3.3443E−03 | 7.4040E−04 | 6.9317E−02 | 1.7703E−02 | 1.4699E−03 | 1.7628E−04 |
| A12 = | 6.9696E−05 | −4.7596E−04 | −4.5271E−02 | 1.7266E−03 | −2.4351E−03 | 3.6443E−05 |
| A14 = | −3.8630E−04 | | 1.6509E−02 | −2.6381E−03 | 2.6120E−13 | −8.6106E−05 |
| A16 = | | | −2.3444E−03 | 8.0491E−04 | | |

| Surface # | 8 | 9 | 10 | 11 | 12 | 13 |
|---|---|---|---|---|---|---|
| k = | 1.5345E+00 | −6.8412E−01 | −7.1679E+00 | −2.0800E+01 | 3.0000E+00 | −3.0276E+00 |
| A4 = | −1.6418E−02 | 4.5950E−02 | −3.9282E−02 | 1.4997E−02 | −1.3438E−02 | −4.3903E−02 |
| A6 = | 2.1712E−03 | −2.3202E−02 | 4.9429E−03 | −7.2369E−03 | 1.6227E−02 | 1.3799E−02 |
| A8 = | 4.7769E−03 | 1.3787E−02 | −1.1426E−03 | 9.4842E−04 | −6.2674E−03 | −3.4336E−03 |
| A10 = | −6.5820E−04 | −2.5963E−03 | 8.9514E−06 | −5.2310E−05 | 1.2643E−03 | 5.8363E−04 |
| A12 = | −3.5452E−05 | 1.3827E−04 | −3.5075E−06 | 1.3275E−06 | −1.4211E−04 | −6.7588E−05 |
| A14 = | −3.9740E−06 | 8.8223E−07 | 2.7375E−06 | −4.0925E−08 | 8.4807E−06 | 5.0038E−06 |
| A16 = | | | | | −2.1169E−07 | −2.0845E−07 |
| A18 = | | | | | | 3.6334E−09 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A18 represent the aspheric coefficients ranging from the 4th order to the 18th order. The tables presented below for each embodiment are the corresponding schematic parameter and aberration curves, and the definitions of the tables are the same as Table 1 and Table 2 of the 1st embodiment. Therefore, an explanation in this regard will not be provided again.

Furthermore, as shown in Table 1, when the focal length of the fifth lens element 150 is f5, the focal length of the sixth lens element 160 is f6, the curvature radius of the image-side surface 152 of the fifth lens element 150 is R10, and the curvature radius of the object-side surface 161 of the sixth lens element 160 is R11, the following relationships are satisfied: f5<f6<0; and R11<0<R10.

2nd Embodiment

Figure 3:
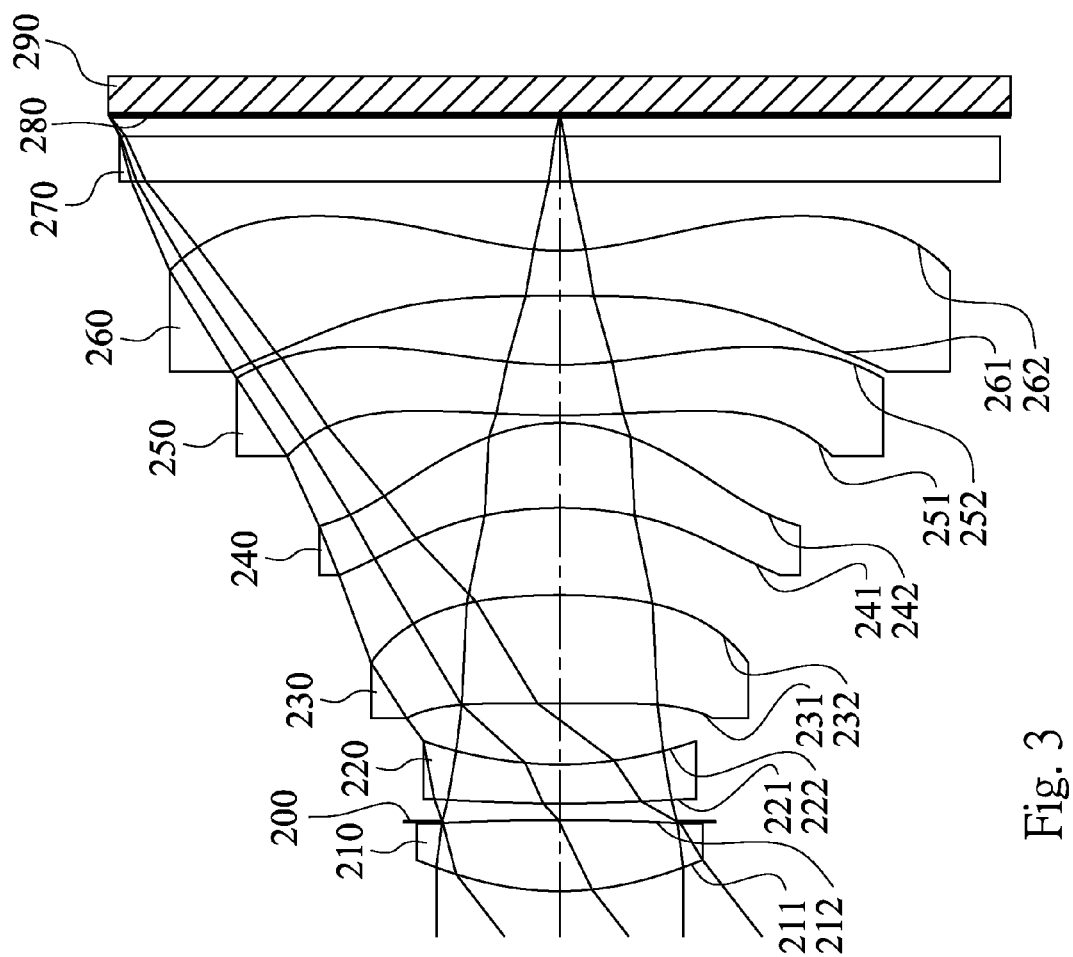
FIG. 3 is a schematic view of an image capturing device according to the 2nd embodiment of the present disclosure.
Figure 4:
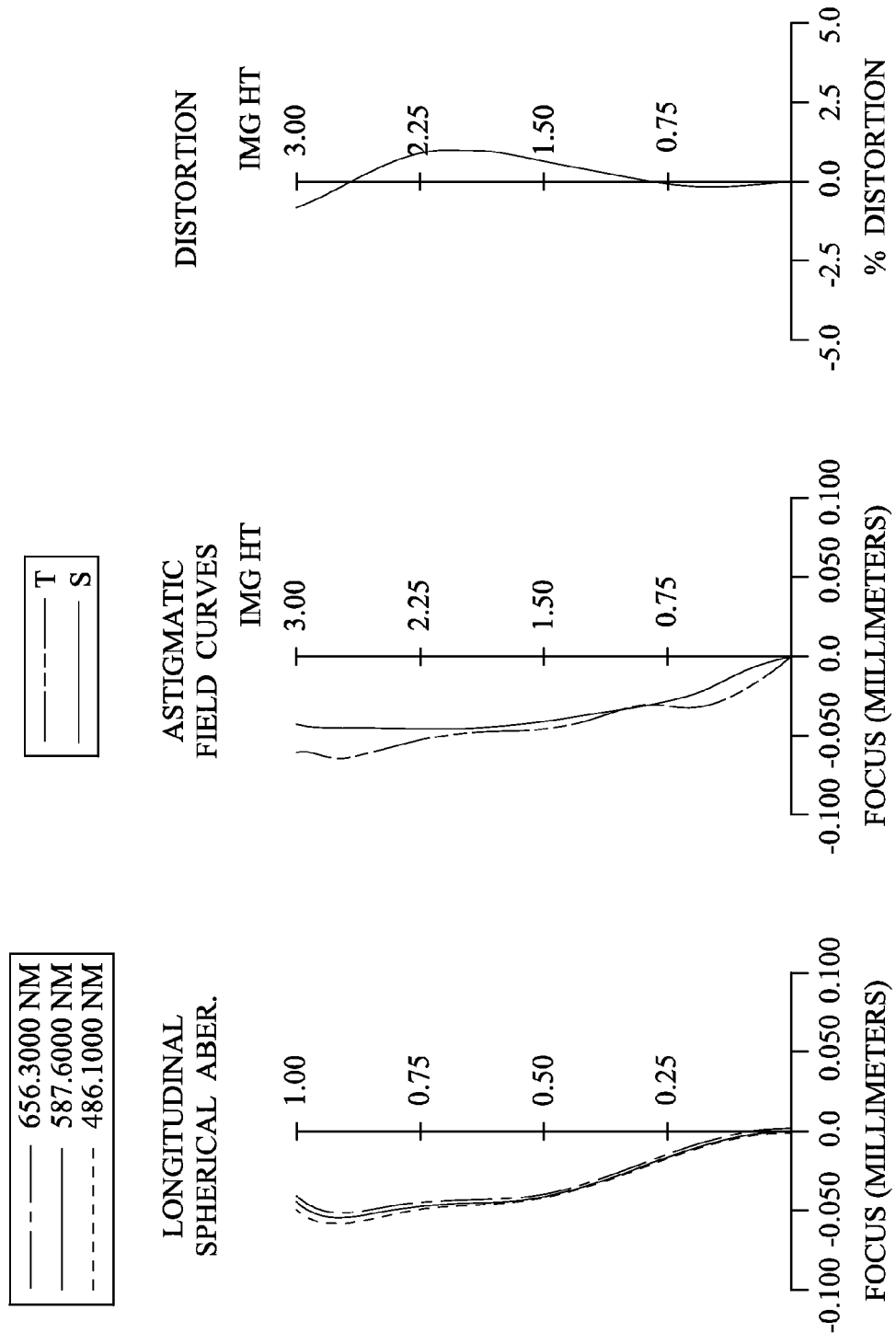
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes a photographing optical lens (its reference numeral is omitted) and an image sensor 290. The photographing optical lens includes, in order from an object side to an image side, a first lens element 210, an aperture stop 200, a second lens element 220, a third lens element 230, a fourth lens element 240, a fifth lens element 250, a sixth lens element 260, an IR-cut filter 270 and an image surface 280. The image sensor 290 is located on or near the image surface 280 of the photographing optical lens. The photographing optical lens has a total of six lens elements (210-260) with refractive power. Each of the first lens element 210, the second lens element 220, the third lens element 230, the fourth lens element 240, the fifth lens element 250 and the sixth lens element 260 is a single and non-cemented lens element.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. Furthermore, the image-side surface 252 of the fifth lens element 250 has a convex shape in an off-axis region thereof.

The sixth lens element 260 with negative refractive power has an object-side surface 261 being concave in a paraxial region thereof and an image-side surface 262 being concave in a paraxial region thereof. The sixth lens element 260 is made of plastic material and has the object-side surface 261 and the image-side surface 262 being both aspheric. Furthermore, the image-side surface 262 of the sixth lens element 260 has at least one inflection point.

Moreover, the negative refractive power of the sixth lens element 260 is stronger than the negative refractive power of other lens elements with negative refractive power of the photographing optical lens.

The IR-cut filter 270 is made of glass material and located between the sixth lens element 260 and the image surface 280, and will not affect a focal length of the photographing optical lens.

The detailed optical data of the 2nd embodiment are shown in Table 3 and the aspheric surface data are shown in Table 4 below.

TABLE 3

2nd Embodiment
f = 3.94 mm, Fno = 2.40, HFOV = 37.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.132 | ASP | 0.472 | Plastic | 1.544 | 55.9 | 3.63 |
| 2 | | −24.565 | ASP | −0.009 | | | | |
| 3 | Ape. Stop | Plano | | 0.119 | | | | |
| 4 | Lens 2 | 6.844 | ASP | 0.260 | Plastic | 1.632 | 23.4 | −5.73 |
| 5 | | 2.335 | ASP | 0.407 | | | | |
| 6 | Lens 3 | 31.938 | ASP | 0.721 | Plastic | 1.544 | 55.9 | 6.93 |
| 7 | | −4.244 | ASP | 0.580 | | | | |
| 8 | Lens 4 | −2.644 | ASP | 0.566 | Plastic | 1.544 | 55.9 | 3.20 |
| 9 | | −1.130 | ASP | 0.050 | | | | |
| 10 | Lens 5 | 6.695 | ASP | 0.336 | Plastic | 1.632 | 23.4 | −7.42 |
| 11 | | 2.705 | ASP | 0.459 | | | | |
| 12 | Lens 6 | −65.253 | ASP | 0.300 | Plastic | 1.544 | 55.9 | −3.12 |
| 13 | | 1.744 | ASP | 0.461 | | | | |
| 14 | IR-cut filter | Plano | | 0.300 | Glass | 1.517 | 64.2 | — |
| 15 | | Plano | | 0.142 | | | | |
| 16 | Image | Plano | | — | | | | |

Note:
Reference wavelength is 587.6 nm (d-line).

TABLE 4

Aspheric Coefficients

| Surface # | 1 | 2 | 4 | 5 | 6 | 7 |
|---|---|---|---|---|---|---|
| k = | −5.7919E+00 | −2.9493E+00 | −1.0000E+01 | −1.5000E+01 | 3.0000E+00 | −5.1861E+00 |
| A4 = | 7.1999E−02 | −5.0884E−02 | −1.3094E−01 | 1.8731E−02 | −7.3844E−02 | −7.7863E−02 |
| A6 = | −4.6943E−02 | 1.1352E−01 | 2.8985E−01 | 8.0800E−02 | −2.5794E−02 | −5.9605E−03 |
| A8 = | 2.9413E−02 | −1.4790E−01 | −4.6600E−01 | −1.2295E−01 | 1.7080E−02 | −1.3629E−02 |
| A10 = | −2.0448E−02 | 6.4535E−02 | 6.9284E−01 | 9.2764E−02 | −3.9573E−02 | 3.0641E−03 |
| A12 = | 2.9083E−03 | −1.0894E−02 | −8.0817E−01 | 2.0671E−02 | 1.0725E−02 | −6.0140E−04 |
| A14 = | −7.8312E−03 | | 5.2175E−01 | −8.0317E−02 | 5.5914E−03 | |
| A16 = | | | −1.2137E−01 | 3.6305E−02 | | |

| Surface # | 8 | 9 | 10 | 11 | 12 | 13 |
|---|---|---|---|---|---|---|
| k = | 1.6016E+00 | −6.3362E−01 | −2.5857E+00 | −2.7311E+01 | 3.0000E+00 | −6.3738E+00 |
| A4 = | −2.6916E−02 | 1.5221E−01 | −4.9866E−02 | −8.3552E−03 | −9.7813E−02 | −7.6152E−02 |
| A6 = | −8.9804E−03 | −1.1620E−01 | 6.1994E−03 | −7.7296E−03 | 6.7667E−02 | 4.2531E−02 |
| A8 = | 2.7594E−02 | 8.8587E−02 | −9.1336E−04 | 1.5592E−03 | −3.7741E−02 | −1.9309E−02 |
| A10 = | −6.4300E−03 | −2.5969E−02 | −3.0566E−04 | −8.4475E−06 | 1.3166E−02 | 6.0091E−03 |
| A12 = | 3.3487E−04 | 2.8794E−03 | −4.3447E−05 | −2.4505E−05 | −2.5631E−03 | −1.2274E−03 |
| A14 = | | | 2.0781E−05 | 1.5003E−06 | 2.5689E−04 | 1.5479E−04 |
| A16 = | | | | | −1.0501E−05 | −1.0868E−05 |
| A18 = | | | | | 8.5443E−09 | 3.2290E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f (mm) | 3.94 | (R9−R10)/(R9 + R10) | 0.42 |
| Fno | 2.40 | (R11 + R12)/(R11−R12) | 0.95 |
| HFOV (deg.) | 37.8 | f/f3 | 0.57 |
| (V2 + V5)/V6 | 0.84 | f4/f3 | 0.46 |
| CT3/CT4 | 1.27 | f6/f5 | 0.42 |

-continued

| 2nd Embodiment | | | |
|---|---|---|---|
| f/R3 | 0.58 | SD/TD | 0.89 |
| f/R6 | −0.93 | TL/ImgH | 1.72 |

Furthermore, as shown in Table 3, when a focal length of the fifth lens element 250 is f5, a focal length of the sixth lens element 260 is f6, a curvature radius of the image-side surface 252 of the fifth lens element 250 is R10, and a curvature radius of the object-side surface 261 of the sixth lens element 260 is R11, the following relationships are satisfied: f5<f6<0; and R11<0<R10.

3rd Embodiment

Figure 5:
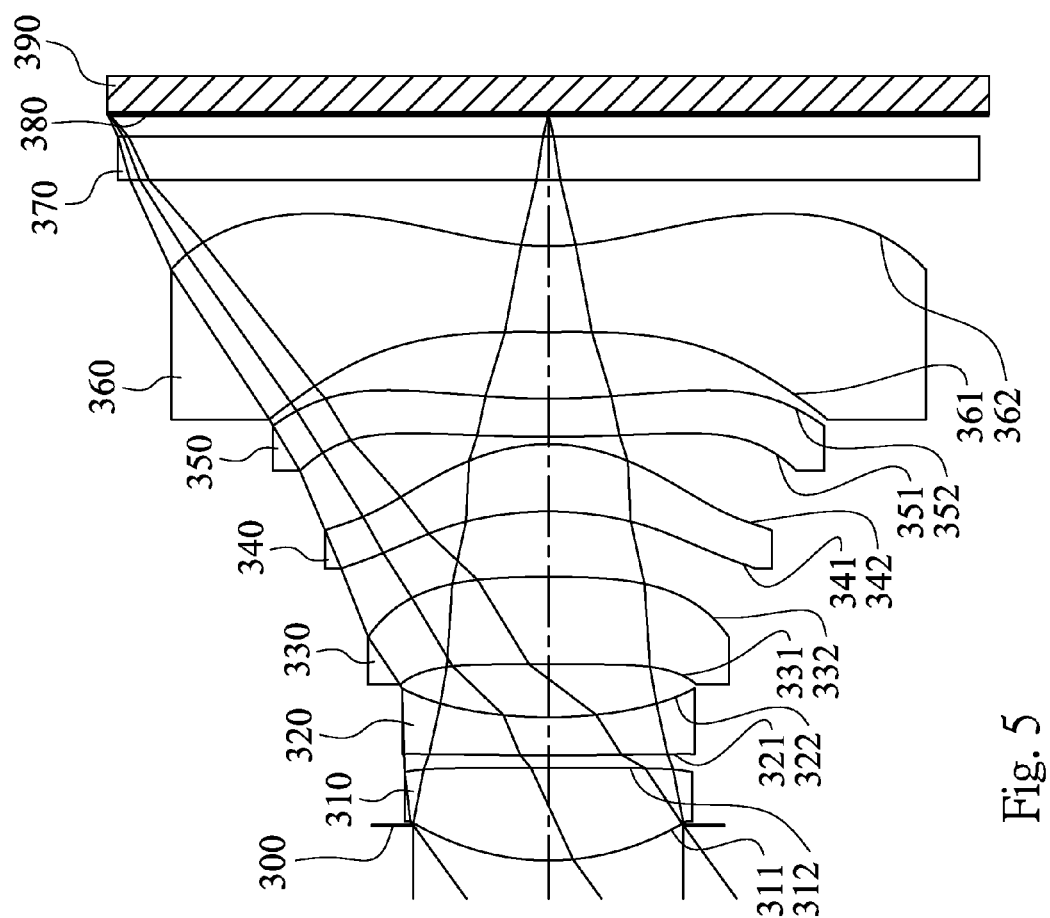
FIG. 5 is a schematic view of an image capturing device according to the 3rd embodiment of the present disclosure.
Figure 6:
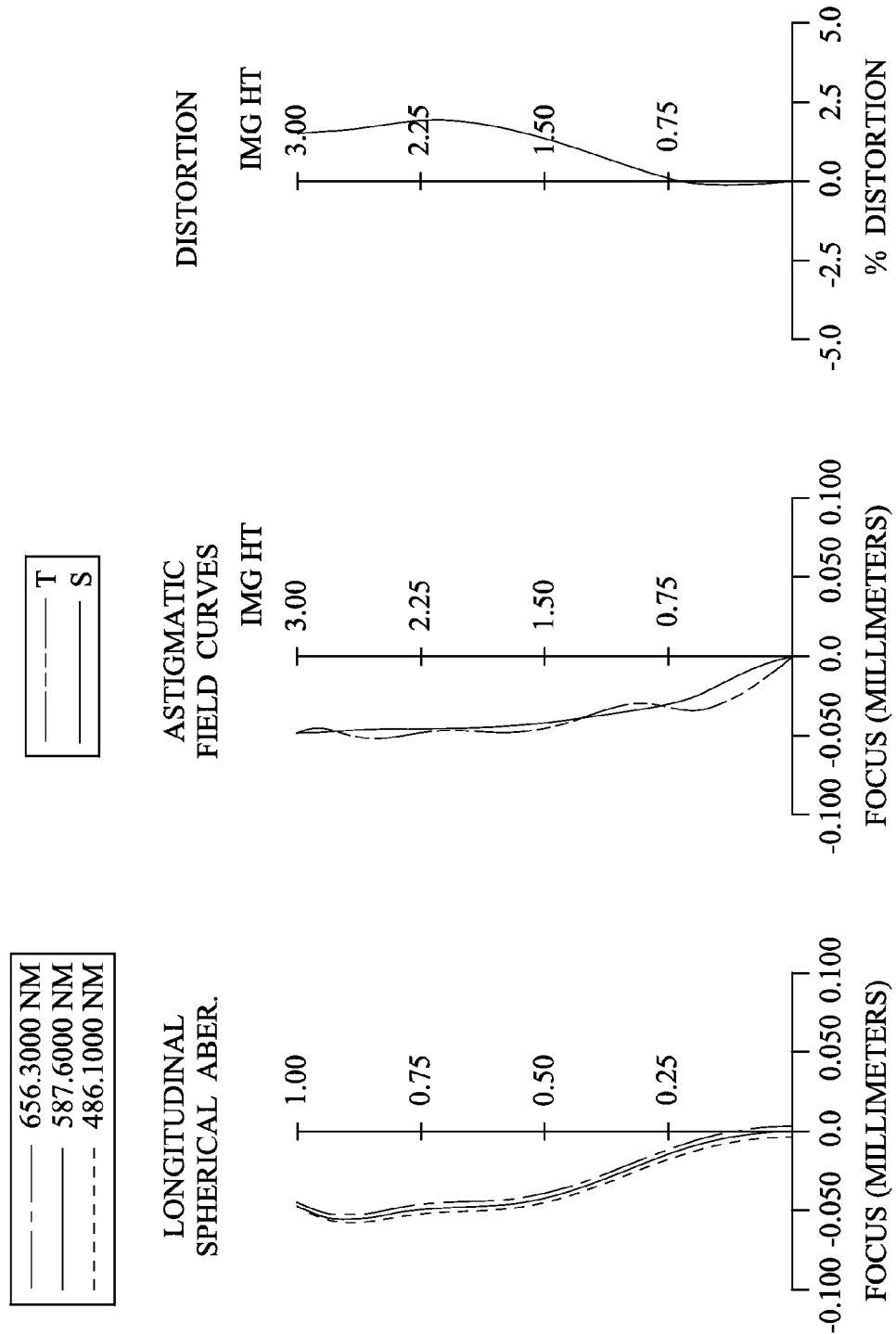
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes a photographing optical lens (its reference numeral is omitted) and an image sensor 390. The photographing optical lens includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380. The image sensor 390 is located on or near the image surface 380 of the photographing optical lens. The photographing optical lens has a total of six lens elements (310-360) with refractive power. Each of the first lens element 310, the second lens element 320, the third lens element 330, the fourth lens element 340, the fifth lens element 350 and the sixth lens element 360 is a single and non-cemented lens element.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. Furthermore, the image-side surface 352 of the fifth lens element 350 has a convex shape in an off-axis region thereof.

The sixth lens element 360 with negative refractive power has an object-side surface 361 being concave in a paraxial region thereof and an image-side surface 362 being concave in a paraxial region thereof. The sixth lens element 360 is made of plastic material and has the object-side surface 361 and the image-side surface 362 being both aspheric. Furthermore, the image-side surface 362 of the sixth lens element 360 has at least one inflection point.

Moreover, the negative refractive power of the sixth lens element 360 is stronger than the negative refractive power of other lens elements with negative refractive power of the photographing optical lens.

The IR-cut filter 370 is made of glass material and located between the sixth lens element 360 and the image surface 380, and will not affect a focal length of the photographing optical lens.

The detailed optical data of the 3rd embodiment are shown in Table 5 and the aspheric surface data are shown in Table 6 below.

TABLE 5

3rd Embodiment
f = 4.11 mm, Fno = 2.23, HFOV = 36.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.240 | | | | |
| 2 | Lens 1 | 1.777 | ASP | 0.632 | Plastic | 1.544 | 55.9 | 3.32 |
| 3 | | 95.236 | ASP | 0.086 | | | | |
| 4 | Lens 2 | 17.416 | ASP | 0.260 | Plastic | 1.640 | 23.3 | −5.66 |
| 5 | | 2.979 | ASP | 0.362 | | | | |
| 6 | Lens 3 | 32.941 | ASP | 0.600 | Plastic | 1.530 | 55.8 | 10.33 |
| 7 | | −6.525 | ASP | 0.445 | | | | |
| 8 | Lens 4 | −2.488 | ASP | 0.461 | Plastic | 1.530 | 55.8 | 4.07 |
| 9 | | −1.229 | ASP | 0.050 | | | | |
| 10 | Lens 5 | 10.424 | ASP | 0.260 | Plastic | 1.640 | 23.3 | −12.68 |
| 11 | | 4.517 | ASP | 0.456 | | | | |
| 12 | Lens 6 | −66.667 | ASP | 0.586 | Plastic | 1.530 | 55.8 | −3.41 |
| 13 | | 1.861 | ASP | 0.451 | | | | |
| 14 | IR-cut filter | Plano | | 0.300 | Glass | 1.517 | 64.2 | — |
| 15 | | Plano | | 0.153 | | | | |
| 16 | Image | Plano | | — | | | | |

Note:
Reference wavelength is 587.6 nm (d-line).

TABLE 6

Aspheric Coefficients

| Surface # | 2 | 3 | 4 | 5 | 6 | 7 |
|---|---|---|---|---|---|---|
| k= | −3.5794E+00 | 3.0000E+00 | −1.0000E+01 | −1.5000E+01 | −1.0000E+01 | −5.7208E+00 |
| A4 = | 8.3114E−02 | −4.7558E−02 | −8.5598E−02 | 2.0672E−02 | −9.0666E−02 | −8.4972E−02 |
| A6 = | −2.5602E−02 | 1.1163E−01 | 2.7002E−01 | 1.3722E−01 | −9.9574E−03 | −1.2064E−02 |

TABLE 6-continued

Aspheric Coefficients

|  |  |  |  |  |  |  |
|---|---|---|---|---|---|---|
| A8 = | 1.7479E-02 | -1.3351E-01 | -5.1549E-01 | -1.9397E-01 | -3.6866E-02 | -1.3486E-02 |
| A10 = | -1.0121E-02 | 3.1473E-02 | 7.3817E-01 | 1.2654E-01 | 2.3662E-02 | 1.2708E-03 |
| A12 = | 6.2431E-03 | -4.0495E-04 | -8.0575E-01 | 2.0423E-02 | -3.6394E-02 | -1.7567E-04 |
| A14 = | -9.9095E-03 |  | 4.9981E-01 | -8.1745E-02 | 7.7076E-03 |  |
| A16 = |  |  | -1.2000E-01 | 4.1200E-02 |  |  |

| Surface # | 8 | 9 | 10 | 11 | 12 | 13 |
|---|---|---|---|---|---|---|
| k = | 1.5652E+00 | -6.8371E-01 | 4.1665E-03 | -1.0000E+02 | -1.0000E+01 | -5.6080E+00 |
| A4 = | -3.1942E-02 | 9.6966E-02 | -2.0024E-02 | 4.4025E-03 | -1.2262E-01 | -7.7710E-02 |
| A6 = | 7.6629E-02 | -8.6073E-02 | -1.2855E-03 | -1.3828E-02 | 7.0584E-02 | 4.2199E-02 |
| A8 = | 3.0254E-02 | 8.7104E-02 | -3.7156E-03 | 9.5200E-04 | -3.9166E-02 | -1.9181E-02 |
| A10 = | -6.4867E-03 | -2.7431E-02 | 2.8539E-04 | 9.2446E-05 | 1.4056E-02 | 5.9731E-03 |
| A12 = | -4.6604E-04 | 2.4420E-03 | -1.1246E-04 | 1.7164E-05 | -2.7121E-03 | -1.2198E-03 |
| A14 = | -2.2411E-05 | 5.2005E-06 | 5.3241E-05 | -1.5221E-06 | 2.5635E-04 | 1.5391E-04 |
| A16 = |  |  |  |  | -1.0805E-05 | -1.0798E-05 |
| A18 = |  |  |  |  | 1.0359E-07 | 3.1868E-07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f (mm) | 4.11 | (R9-R10)/(R9 + R10) | 0.40 |
| Fno | 2.23 | (R11 + R12)/(R11-R12) | 0.95 |
| HFOV (deg.) | 36.0 | f/f3 | 0.40 |
| (V2 + V5)/V6 | 0.84 | f4/f3 | 0.39 |
| CT3/CT4 | 1.30 | f6/f5 | 0.27 |
| f/R3 | 0.24 | SD/TD | 0.94 |
| f/R6 | -0.63 | TL/ImgH | 1.70 |

Furthermore, as shown in Table 5, when a focal length of the fifth lens element 350 is f5, a focal length of the sixth lens element 360 is f6, a curvature radius of the image-side surface 352 of the fifth lens element 350 is R10, and a curvature radius of the object-side surface 361 of the sixth lens element 360 is R11, the following relationships are satisfied: f5<f6<0; and R11<0<R10.

4th Embodiment

Figure 7:
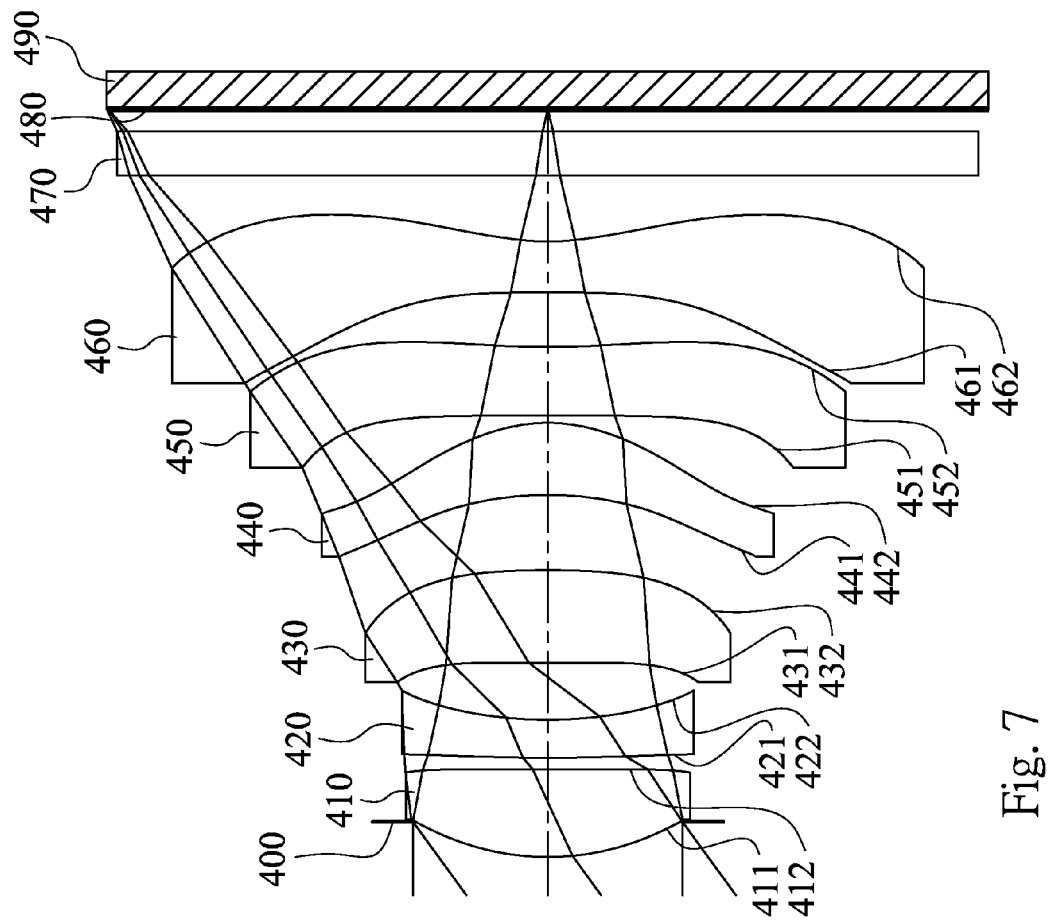
FIG. 7 is a schematic view of an image capturing device according to the 4th embodiment of the present disclosure.
Figure 8:
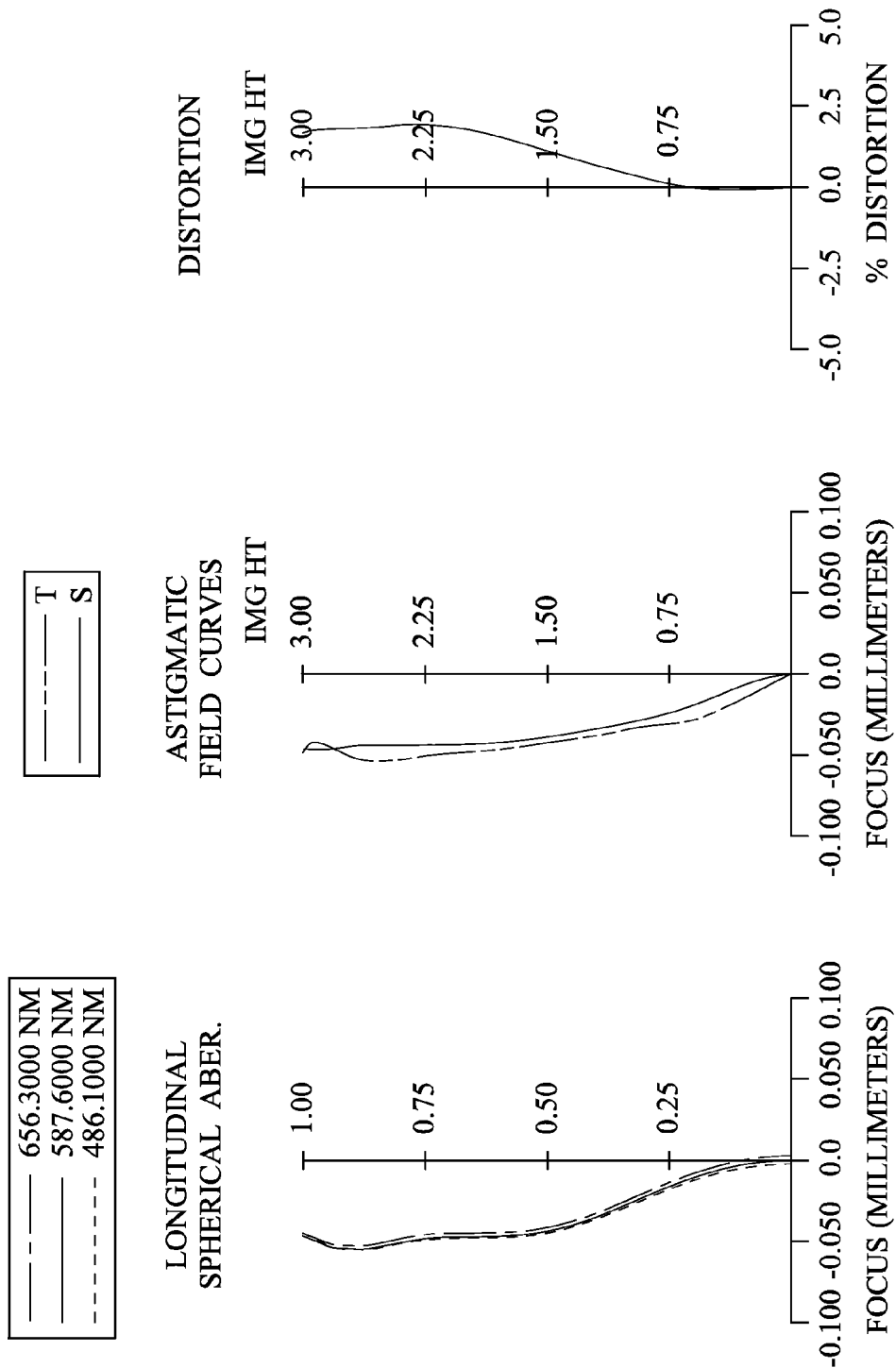
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes a photographing optical lens (its reference numeral is omitted) and an image sensor 490. The photographing optical lens includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image surface 480. The image sensor 490 is located on or near the image surface 480 of the photographing optical lens. The photographing optical lens has a total of six lens elements (410-460) with refractive power. Each of the first lens element 410, the second lens element 420, the third lens element 430, the fourth lens element 440, the fifth lens element 450 and the sixth lens element 460 is a single and non-cemented lens element.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric. Furthermore, the image-side surface 452 of the fifth lens element 450 has a convex shape in an off-axis region thereof.

The sixth lens element 460 with negative refractive power has an object-side surface 461 being concave in a paraxial region thereof and an image-side surface 462 being concave in a paraxial region thereof. The sixth lens element 460 is made of plastic material and has the object-side surface 461 and the image-side surface 462 being both aspheric. Furthermore, the image-side surface 462 of the sixth lens element 460 has at least one inflection point.

Moreover, the negative refractive power of the sixth lens element 460 is stronger than the negative refractive power of other lens elements with negative refractive power of the photographing optical lens.

The IR-cut filter 470 is made of glass material and located between the sixth lens element 460 and the image surface 480, and will not affect a focal length of the photographing optical lens.

The detailed optical data of the 4th embodiment are shown in Table 7 and the aspheric surface data are shown in Table 8 below.

TABLE 7

4th Embodiment
f = 4.10 mm, Fno = 2.23, HFOV = 36.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.240 | | | | |
| 2 | Lens 1 | 1.802 | ASP | 0.599 | Plastic | 1.544 | 55.9 | 3.40 |
| 3 | | 63.272 | ASP | 0.079 | | | | |
| 4 | Lens 2 | 10.636 | ASP | 0.260 | Plastic | 1.640 | 23.3 | −6.12 |
| 5 | | 2.835 | ASP | 0.390 | | | | |
| 6 | Lens 3 | 42.116 | ASP | 0.634 | Plastic | 1.530 | 55.8 | 9.68 |
| 7 | | −5.810 | ASP | 0.513 | | | | |
| 8 | Lens 4 | −2.500 | ASP | 0.493 | Plastic | 1.530 | 55.8 | 3.50 |
| 9 | | −1.138 | ASP | 0.050 | | | | |
| 10 | Lens 5 | −795.102 | ASP | 0.468 | Plastic | 1.640 | 23.3 | −7.92 |
| 11 | | 5.100 | ASP | 0.373 | | | | |
| 12 | Lens 6 | −65.272 | ASP | 0.349 | Plastic | 1.530 | 55.8 | −3.31 |
| 13 | | 1.804 | ASP | 0.451 | | | | |
| 14 | IR-cut filter | Plano | | 0.300 | Glass | 1.517 | 64.2 | — |
| 15 | | Plano | | 0.152 | | | | |
| 16 | Image | Plano | | — | | | | |

Note:
Reference wavelength is 587.6 nm (d-line).

TABLE 8

Aspheric Coefficients

| Surface # | 2 | 3 | 4 | 5 | 6 | 7 |
|---|---|---|---|---|---|---|
| k = | −3.3300E+00 | 3.0000E+00 | −1.0000E+01 | −1.5000E+01 | −2.6510E+00 | −4.4133E+00 |
| A4 = | 7.5295E−02 | −5.1554E−02 | −9.3982E−02 | 2.3639E−02 | −8.0014E−02 | −8.4321E−02 |
| A6 = | −2.4113E−02 | 1.2633E−01 | 2.7671E−01 | 1.2516E−01 | −1.7872E−02 | −2.6297E−03 |
| A8 = | 2.0880E−02 | −1.5546E−01 | −5.1866E−01 | −1.8275E−01 | −2.3902E−02 | −2.2052E−02 |
| A10 = | −1.4488E−02 | 4.8445E−02 | 7.4558E−01 | 1.2566E−01 | 2.7444E−02 | 6.2031E−03 |
| A12 = | 6.1751E−03 | 5.5942E−04 | −8.0721E−01 | 2.3339E−02 | −4.2157E−02 | 1.6543E−03 |
| A14 = | −9.1015E−03 | −4.8953E−03 | 4.9731E−01 | −8.6177E−02 | 1.2372E−02 | −1.7542E−03 |
| A16 = | | | −1.2000E−01 | 4.1200E−02 | | |

| Surface # | 8 | 9 | 10 | 11 | 12 | 13 |
|---|---|---|---|---|---|---|
| k = | 1.4219E+00 | −7.1550E−01 | −1.0000E+01 | −1.0000E+02 | −1.0000E+01 | −7.8954E+00 |
| A4 = | −3.9723E−02 | 1.2452E−01 | −1.4716E−02 | −2.7489E−02 | −1.4935E−01 | −8.5966E−02 |
| A6 = | 7.7409E−03 | −9.4675E−02 | −1.1982E−02 | 1.2534E−04 | 8.9802E−02 | 4.7850E−02 |
| A8 = | 2.9590E−02 | 8.6501E−02 | 5.5330E−03 | 4.5764E−04 | −4.1648E−02 | −2.0437E−02 |
| A10 = | −6.9957E−03 | −2.6996E−02 | −2.4008E−03 | −2.3139E−04 | 1.3389E−02 | 6.0805E−03 |
| A12 = | −5.1424E−04 | 2.5781E−03 | 7.0378E−05 | 2.4342E−05 | −2.5547E−03 | −1.2202E−03 |
| A14 = | 4.8839E−05 | 1.0965E−05 | 5.0728E−05 | 1.0069E−06 | 2.5813E−04 | 1.5392E−04 |
| A16 = | | | | | −1.0941E−05 | −1.0816E−05 |
| A18 = | | | | | | 3.1650E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f (mm) | 4.10 | (R9-R10)/(R9 + R10) | 1.01 |
| Fno | 2.23 | (R11 + R12)/(R11-R12) | 0.95 |
| HFOV (deg.) | 36.0 | f/f3 | 0.42 |
| (V2 + V5)/V6 | 0.84 | f4/f3 | 0.36 |
| CT3/CT4 | 1.29 | f6/f5 | 0.42 |

-continued

| 4th Embodiment | | | |
|---|---|---|---|
| f/R3 | 0.39 | SD/TD | 0.94 |
| f/R6 | −0.71 | TL/ImgH | 1.70 |

Furthermore, as shown in Table 7, when a focal length of the fifth lens element 450 is f5, a focal length of the sixth lens element 460 is f6, a curvature radius of the image-side surface 452 of the fifth lens element 450 is R10, and a curvature radius of the object-side surface 461 of the sixth lens element 460 is R11, the following relationships are satisfied: f5<f6<0; and R11<0<R10.

5th Embodiment

Figure 9:
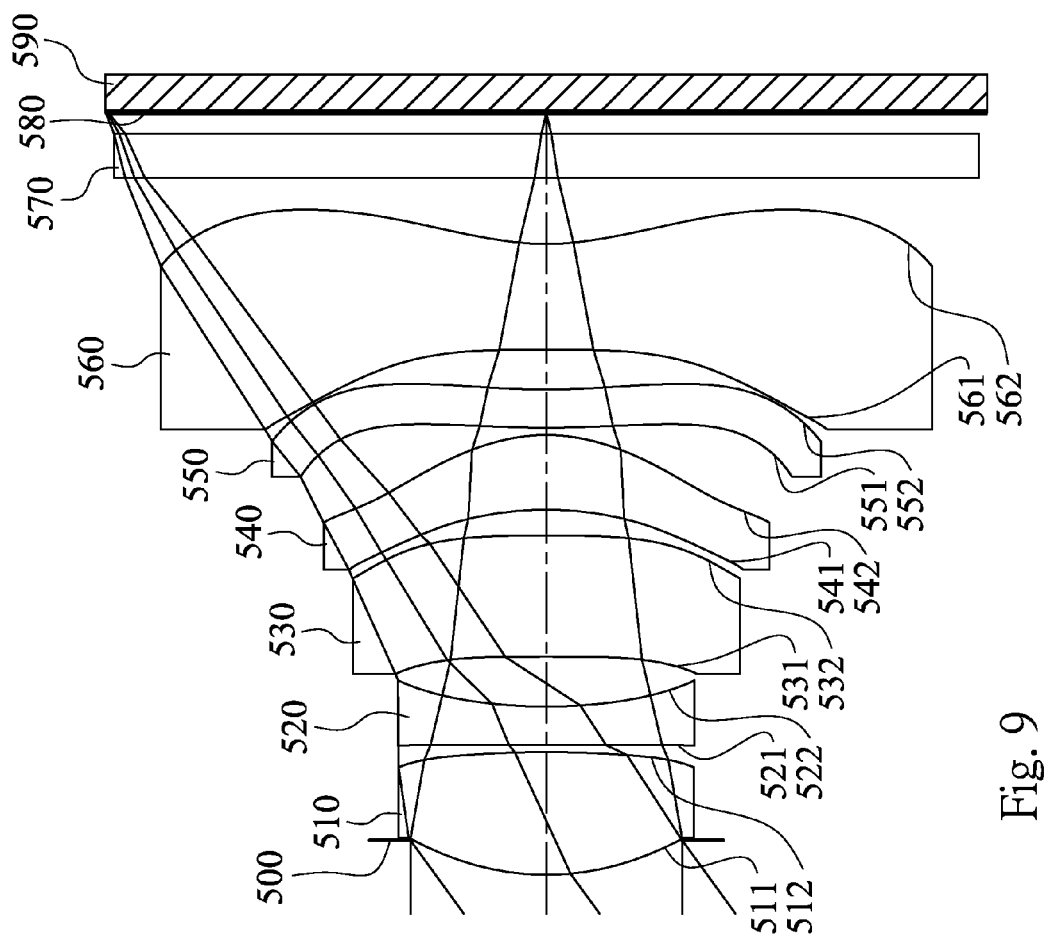
FIG. 9 is a schematic view of an image capturing device according to the 5th embodiment of the present disclosure.
Figure 10:
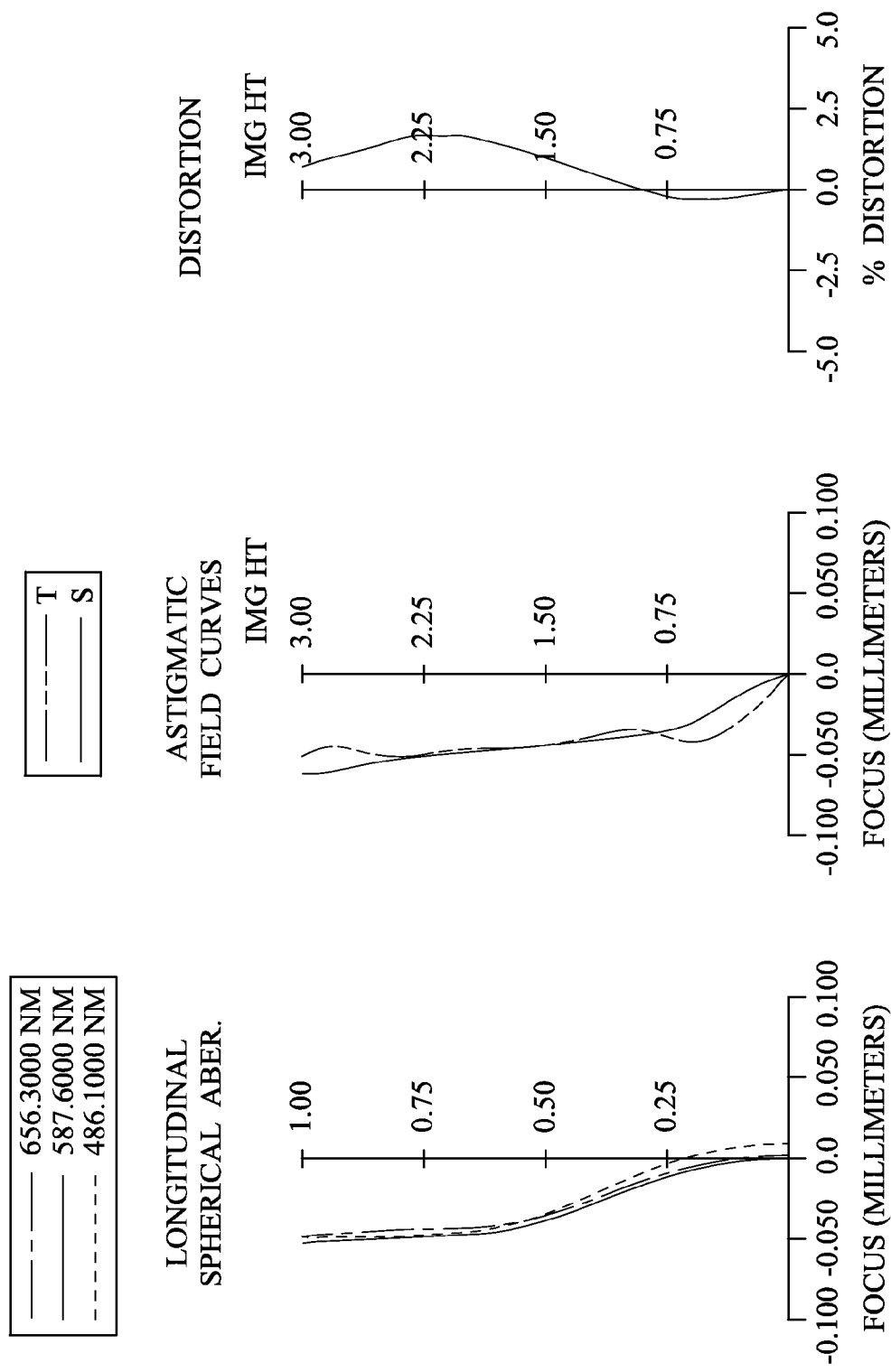
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes a photographing optical lens (its reference numeral is omitted) and an image sensor 590. The photographing optical lens includes, in order from an object side to an image side, an aperture stop 500, a first lens element 510, a second lens element 520, a third lens element 530, a fourth lens element 540, a fifth lens element 550, a sixth lens element 560, an IR-cut filter 570 and an image surface 580. The image sensor 590 is located on or near the image surface 580 of the photographing optical lens. The photographing optical lens has a total of six lens elements (510-560) with refractive power. Each of the first lens element 510, the second lens element 520, the third lens element 530, the fourth lens element 540, the fifth lens element 550 and the sixth lens element 560 is a single and non-cemented lens element.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. Furthermore, the image-side surface 552 of the fifth lens element 550 has a convex shape in an off-axis region thereof.

The sixth lens element 560 with negative refractive power has an object-side surface 561 being concave in a paraxial region thereof and an image-side surface 562 being concave in a paraxial region thereof. The sixth lens element 560 is made of plastic material and has the object-side surface 561 and the image-side surface 562 being both aspheric. Furthermore, the image-side surface 562 of the sixth lens element 560 has at least one inflection point.

Moreover, the negative refractive power of the sixth lens element 560 is stronger than the negative refractive power of other lens elements with negative refractive power of the photographing optical lens.

The IR-cut filter 570 is made of glass material and located between the sixth lens element 560 and the image surface 580, and will not affect a focal length of the photographing optical lens.

The detailed optical data of the 5th embodiment are shown in Table 9 and the aspheric surface data are shown in Table 10 below.

TABLE 9

5th Embodiment
f = 4.14 mm, Fno = 2.23, HFOV = 36.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.235 | | | | |
| 2 | Lens 1 | 1.809 | ASP | 0.839 | Plastic | 1.544 | 55.9 | 2.70 |
| 3 | | −6.537 | ASP | 0.050 | | | | |
| 4 | Lens 2 | −42.785 | ASP | 0.260 | Plastic | 1.650 | 21.4 | −4.78 |
| 5 | | 3.354 | ASP | 0.342 | | | | |
| 6 | Lens 3 | −73.766 | ASP | 0.829 | Plastic | 1.530 | 55.8 | 34.16 |
| 7 | | −14.593 | ASP | 0.175 | | | | |
| 8 | Lens 4 | −2.414 | ASP | 0.511 | Plastic | 1.535 | 55.7 | 4.02 |
| 9 | | −1.222 | ASP | 0.050 | | | | |
| 10 | Lens 5 | 7.824 | ASP | 0.260 | Plastic | 1.640 | 23.3 | −14.99 |
| 11 | | 4.253 | ASP | 0.272 | | | | |
| 12 | Lens 6 | −118.835 | ASP | 0.723 | Plastic | 1.535 | 55.7 | −3.38 |
| 13 | | 1.841 | ASP | 0.453 | | | | |
| 14 | IR-cut filter | Plano | | 0.300 | Glass | 1.517 | 64.2 | — |
| 15 | | Plano | | 0.147 | | | | |
| 16 | Image | Plano | | — | | | | |

Note:
Reference wavelength is 587.6 nm (d-line).

TABLE 10

Aspheric Coefficients

| Surface # | 2 | 3 | 4 | 5 | 6 | 7 |
|---|---|---|---|---|---|---|
| k = | −3.5488E+00 | −4.0444E+00 | −1.0000E+01 | −1.5000E+01 | 3.0000E+00 | 1.4378E+00 |
| A4 = | 7.1989E−02 | 2.0567E−02 | −6.8854E−03 | 2.3723E−03 | −9.8080E−02 | −9.4281E−02 |
| A6 = | −2.2511E−02 | 5.1585E−02 | 2.0938E−01 | 1.4340E−01 | 1.9041E−02 | 1.6818E−02 |

TABLE 10-continued

| Aspheric Coefficients | | | | | |
|---|---|---|---|---|---|
| A8 = 5.8070E-03 | -1.7113E-01 | -5.3921E-01 | -1.9159E-01 | -4.3038E-02 | -2.0597E-02 |
| A10 = -3.4771E-03 | 7.7840E-02 | 7.7300E-01 | 1.2043E-01 | 5.1752E-02 | 9.1846E-03 |
| A12 = 2.1132E-04 | -4.4298E-03 | -8.0819E-01 | 2.0081E-02 | -4.3521E-02 | 1.5838E-04 |
| A14 = -5.9268E-03 | | 4.9786E-01 | -8.1147E-02 | 1.5859E-02 | 3.7573E-05 |
| A16 = | | -1.2000E-01 | 4.1200E-02 | | |

| Surface # | 8 | 9 | 10 | 11 | 12 | 13 |
|---|---|---|---|---|---|---|
| k = | 1.8025E+00 | -6.9551E-01 | 1.0980E+00 | -1.0000E+02 | -1.0000E+01 | -5.5046E+00 |
| A4 = | -2.3069E-02 | 1.0915E-01 | -4.1464E-02 | -2.1031E-02 | -1.3820E-01 | -8.1066E-02 |
| A6 = | 7.7788E-03 | -8.9607E-02 | -1.7316E-03 | -6.6500E-03 | 7.7711E-02 | 4.5070E-02 |
| A8 = | 2.9716E-02 | 8.6633E-02 | -1.7038E-03 | 8.2902E-04 | -3.9099E-02 | -1.9842E-02 |
| A10 = | -6.6924E-03 | -2.7585E-02 | -7.4289E-05 | -1.4987E-04 | 1.3964E-02 | 6.0424E-03 |
| A12 = | -5.3150E-04 | 2.4277E-03 | -3.6140E-05 | -1.9954E-05 | -2.7409E-03 | -1.2223E-03 |
| A14 = | 2.2012E-05 | -5.4067E-06 | -1.0373E-05 | 5.3636E-06 | 2.5547E-04 | 1.5356E-04 |
| A16 = | | | | | -9.2079E-06 | -1.0726E-05 |
| A18 = | | | | | | 3.1458E-07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f (mm) | 4.14 | (R9-R10)/(R9 + R10) | 0.30 |
| Fno | 2.23 | (R11 + R12)/(R11-R12) | 0.97 |
| HFOV (deg.) | 36.0 | f/f3 | 0.12 |
| (V2 + V5)/V6 | 0.80 | f4/f3 | 0.12 |
| CT3/CT4 | 1.62 | f6/f5 | 0.23 |
| f/R3 | -0.10 | SD/TD | 0.95 |
| f/R6 | -0.28 | TL/ImgH | 1.74 |

Furthermore, as shown in Table 9, when a focal length of the fifth lens element 550 is f5, a focal length of the sixth lens element 560 is f6, a curvature radius of the image-side surface 552 of the fifth lens element 550 is R10, and a curvature radius of the object-side surface 561 of the sixth lens element 560 is R11, the following relationships are satisfied: f5<f6<0; and R11<0<R10.

6th Embodiment

Figure 11:
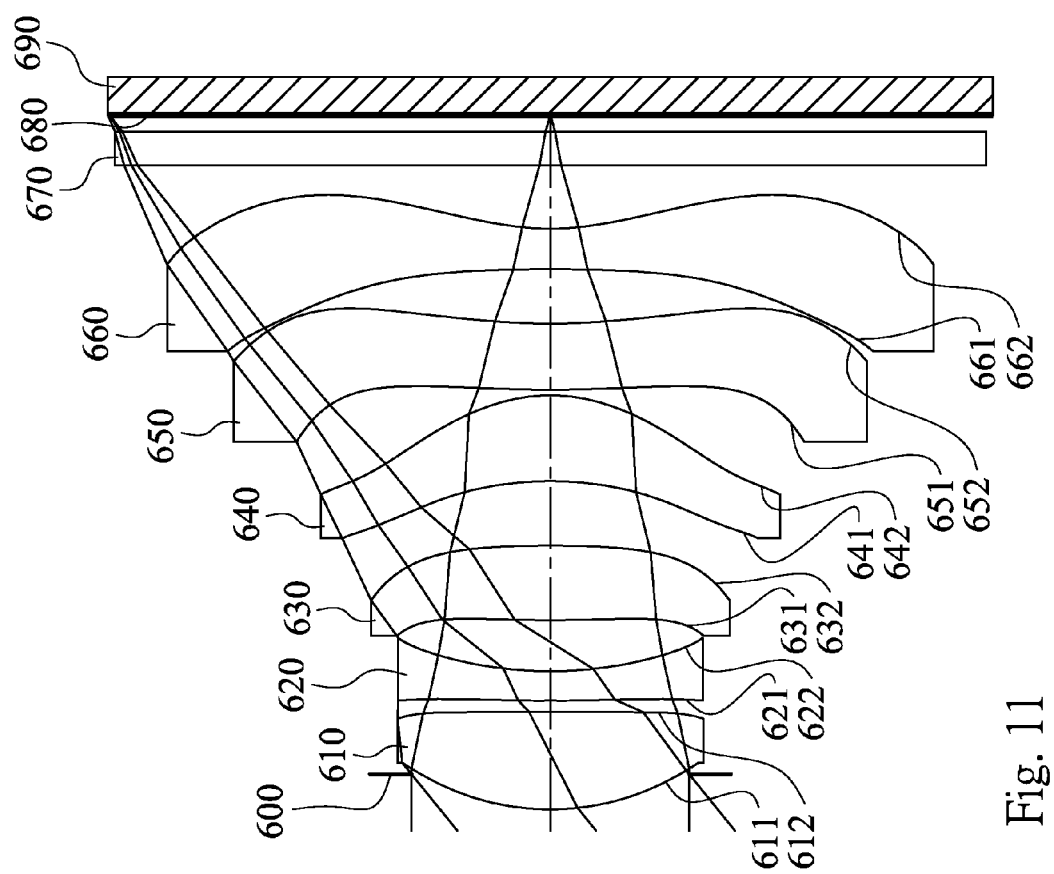
FIG. 11 is a schematic view of an image capturing device according to the 6th embodiment of the present disclosure.
Figure 12:
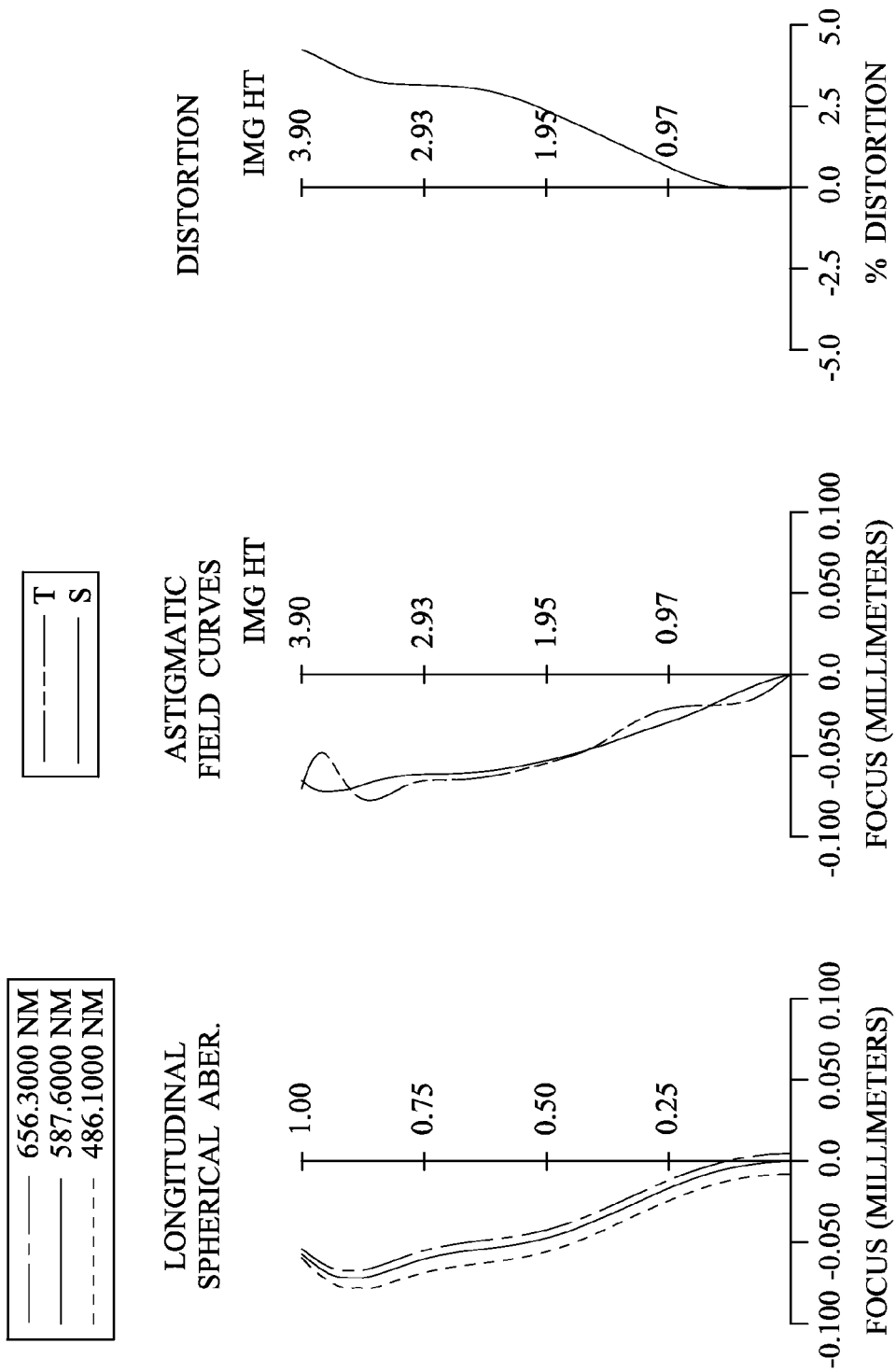
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes a photographing optical lens (its reference numeral is omitted) and an image sensor 690. The photographing optical lens includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image surface 680. The image sensor 690 is located on or near the image surface 680 of the photographing optical lens. The photographing optical lens has a total of six lens elements (610-660) with refractive power. Each of the first lens element 610, the second lens element 620, the third lens element 630, the fourth lens element 640, the fifth lens element 650 and the sixth lens element 660 is a single and non-cemented lens element.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. Furthermore, the image-side surface 652 of the fifth lens element 650 has a convex shape in an off-axis region thereof.

The sixth lens element 660 with negative refractive power has an object-side surface 661 being concave in a paraxial region thereof and an image-side surface 662 being concave in a paraxial region thereof. The sixth lens element 660 is made of plastic material and has the object-side surface 661 and the image-side surface 662 being both aspheric. Furthermore, the image-side surface 662 of the sixth lens element 660 has at least one inflection point.

Moreover, the negative refractive power of the sixth lens element 660 is stronger than the negative refractive power of other lens elements with negative refractive power of the photographing optical lens.

The IR-cut filter 670 is made of glass material and located between the sixth lens element 660 and the image surface 680, and will not affect a focal length of the photographing optical lens.

The detailed optical data of the 6th embodiment are shown in Table 11 and the aspheric surface data are shown in Table 12 below.

TABLE 11

6th Embodiment
f = 4.67 mm, Fno = 1.90, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.312 | | | | |
| 2 | Lens 1 | 2.281 | ASP | 0.865 | Plastic | 1.535 | 56.3 | 4.13 |
| 3 | | −60.899 | ASP | 0.099 | | | | |
| 4 | Lens 2 | 17.618 | ASP | 0.260 | Plastic | 1.634 | 23.8 | −6.59 |
| 5 | | 3.359 | ASP | 0.452 | | | | |
| 6 | Lens 3 | 10.939 | ASP | 0.661 | Plastic | 1.535 | 56.3 | 10.47 |
| 7 | | −11.231 | ASP | 0.571 | | | | |
| 8 | Lens 4 | −3.190 | ASP | 0.760 | Plastic | 1.535 | 56.3 | 4.59 |
| 9 | | −1.502 | ASP | 0.050 | | | | |
| 10 | Lens 5 | 11.272 | ASP | 0.585 | Plastic | 1.583 | 30.2 | −18.83 |
| 11 | | 5.458 | ASP | 0.481 | | | | |
| 12 | Lens 6 | −35.193 | ASP | 0.360 | Plastic | 1.535 | 55.7 | −4.17 |
| 13 | | 2.393 | ASP | 0.560 | | | | |
| 14 | IR-cut filter | Plano | | 0.300 | Glass | 1.517 | 64.2 | — |
| 15 | | Plano | | 0.145 | | | | |
| 16 | Image | Plano | | — | | | | |

Note:
Reference wavelength is 587.6 nm (d-line).

TABLE 12

Aspheric Coefficients

| Surface # | 2 | 3 | 4 | 5 | 6 | 7 |
|---|---|---|---|---|---|---|
| k = | −3.2494E+00 | −1.0000E+01 | −1.0000E+01 | −1.5000E+01 | −9.2121E+00 | −9.1979E+00 |
| A4 = | 3.7477E−02 | −3.5605E−03 | −3.6794E−02 | 1.1816E−02 | −3.7835E−02 | −3.5274E−02 |
| A6 = | −5.1663E−03 | 2.4576E−02 | 7.2460E−02 | 3.2424E−02 | 2.3505E−03 | −1.2195E−03 |
| A8 = | 1.8726E−03 | −2.4624E−02 | −9.0002E−02 | −3.1626E−02 | −1.2028E−02 | −4.1028E−03 |
| A10 = | −2.9941E−04 | 4.5237E−03 | 7.2351E−02 | 1.2594E−02 | 5.1466E−03 | 3.3511E−04 |
| A12 = | 3.6510E−04 | 1.1068E−05 | −4.4981E−02 | 1.1360E−03 | −2.0910E−03 | 2.8368E−05 |
| A14 = | −3.8266E−04 | −3.5608E−05 | 1.6540E−02 | −2.6535E−03 | 7.1265E−05 | −1.7547E−05 |
| A16 = | | | −2.3444E−03 | 8.0491E−04 | | |

| Surface # | 8 | 9 | 10 | 11 | 12 | 13 |
|---|---|---|---|---|---|---|
| k = | 1.5704E+00 | −6.8944E−01 | −7.7041E+00 | −9.0000E+01 | −4.6956E+00 | −3.9600E+00 |
| A4 = | −1.3714E−02 | 4.4094E−02 | −1.4684E−02 | 1.2061E−02 | −3.6307E−02 | −4.1773E−02 |
| A6 = | 2.4149E−03 | −2.3013E−02 | −4.8968E−04 | −4.9723E−03 | 1.7122E−02 | 1.2900E−02 |
| A8 = | 4.8514E−03 | 1.3918E−02 | 2.6387E−04 | 4.0559E−04 | −6.1595E−03 | −3.3473E−03 |
| A10 = | −6.0802E−04 | −2.5749E−03 | −1.5154E−04 | −2.1133E−05 | 1.2713E−03 | 5.8645E−04 |
| A12 = | −2.5653E−05 | 1.3808E−04 | −3.5822E−06 | 1.2710E−06 | −1.4379E−04 | −6.8133E−05 |
| A14 = | −4.8723E−07 | 4.1808E−07 | 1.7822E−06 | −6.5946E−08 | 8.4843E−06 | 5.0227E−06 |
| A16 = | | | | | −2.1204E−07 | −2.0923E−07 |
| A18 = | | | | | | 3.6533E−09 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f (mm) | 4.67 | (R9−R10)/(R9 + R10) | 0.35 |
| Fno | 1.90 | (R11 + R12)/(R11−R12) | 0.87 |
| HFOV (deg.) | 39.0 | f/f3 | 0.45 |
| (V2 + V5)/V6 | 0.97 | f4/f3 | 0.44 |
| CT3/CT4 | 0.87 | f6/f5 | 0.22 |

-continued

| 6th Embodiment | | | |
|---|---|---|---|
| f/R3 | 0.26 | SD/TD | 0.94 |
| f/R6 | −0.42 | TL/ImgH | 1.58 |

Furthermore, as shown in Table 11, when a focal length of the fifth lens element 650 is f5, a focal length of the sixth lens element 660 is f6, a curvature radius of the image-side surface 652 of the fifth lens element 650 is R10, and a curvature radius of the object-side surface 661 of the sixth lens element 660 is R11, the following relationships are satisfied: f5<f6<0; and R11<0<R10.

7th Embodiment

Figure 13:
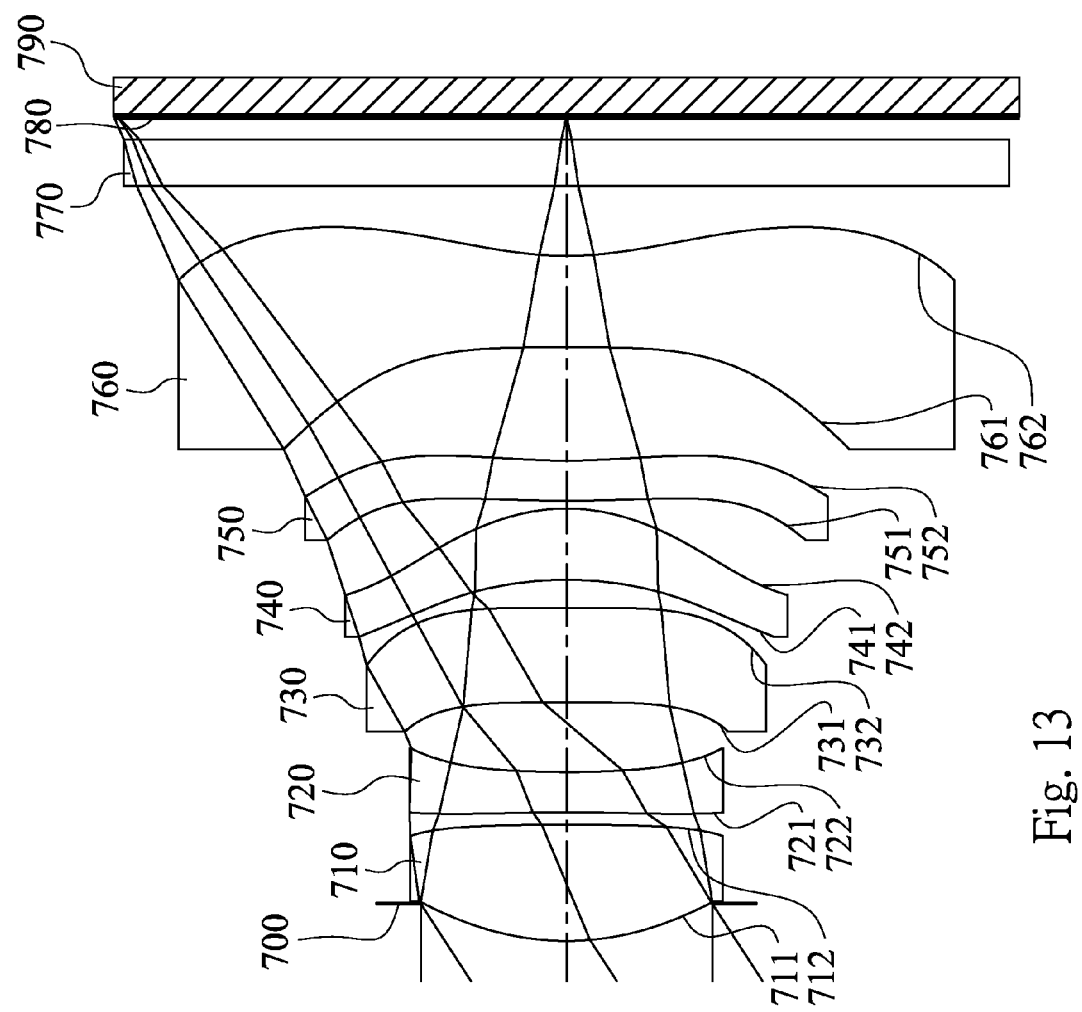
FIG. 13 is a schematic view of an image capturing device according to the 7th embodiment of the present disclosure.
Figure 14:
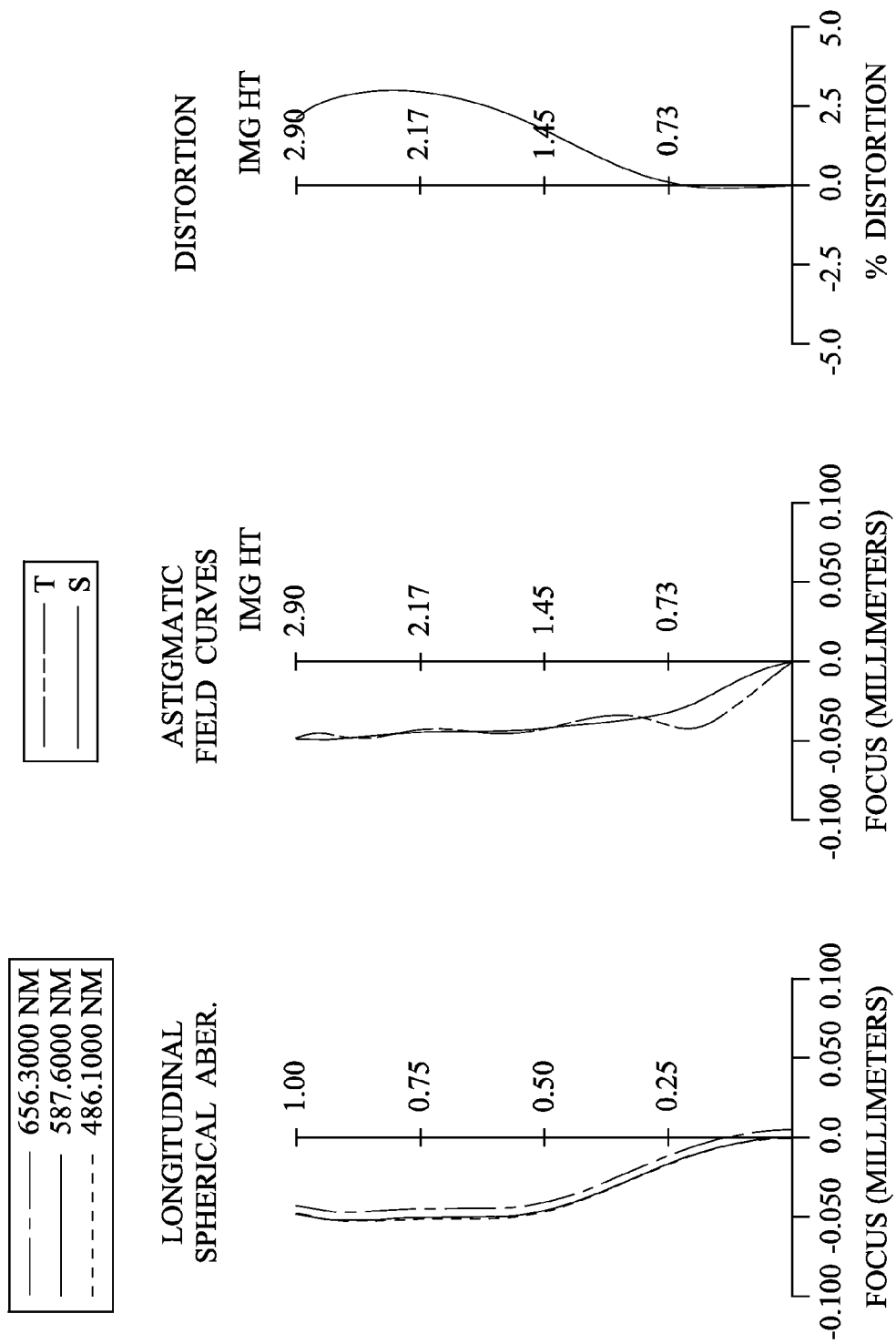
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes a photographing optical lens (its reference numeral is omitted) and an image sensor 790. The photographing optical lens includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image surface 780. The image sensor 790 is located on or near the image surface 780 of the photographing optical lens. The photographing optical lens has a total of six lens elements (710-760) with refractive power. Each of the first lens element 710, the second lens element 720, the third lens element 730, the fourth lens element 740, the fifth lens element 750 and the sixth lens element 760 is a single and non-cemented lens element.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being concave in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. Furthermore, the image-side surface 752 of the fifth lens element 750 has a convex shape in an off-axis region thereof.

The sixth lens element 760 with negative refractive power has an object-side surface 761 being concave in a paraxial region thereof and an image-side surface 762 being concave in a paraxial region thereof. The sixth lens element 760 is made of plastic material and has the object-side surface 761 and the image-side surface 762 being both aspheric. Furthermore, the image-side surface 762 of the sixth lens element 760 has at least one inflection point.

Moreover, the negative refractive power of the sixth lens element 760 is stronger than the negative refractive power of other lens elements with negative refractive power of the photographing optical lens.

The IR-cut filter 770 is made of glass material and located between the sixth lens element 760 and the image surface 780, and will not affect a focal length of the photographing optical lens.

The detailed optical data of the 7th embodiment are shown in Table 13 and the aspheric surface data are shown in Table 14 below.

TABLE 13

7th Embodiment
f = 4.42 mm, Fno = 2.35, HFOV = 33.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.240 | | | | |
| 2 | Lens 1 | 1.807 | ASP | 0.751 | Plastic | 1.535 | 55.7 | 3.16 |
| 3 | | −22.363 | ASP | 0.080 | | | | |
| 4 | Lens 2 | −13.687 | ASP | 0.260 | Plastic | 1.650 | 21.4 | −6.72 |
| 5 | | 6.461 | ASP | 0.451 | | | | |
| 6 | Lens 3 | −89.423 | ASP | 0.610 | Plastic | 1.530 | 55.8 | −57.87 |
| 7 | | 46.785 | ASP | 0.182 | | | | |
| 8 | Lens 4 | −2.453 | ASP | 0.461 | Plastic | 1.535 | 55.7 | 4.11 |
| 9 | | −1.235 | ASP | 0.050 | | | | |
| 10 | Lens 5 | 8.751 | ASP | 0.260 | Plastic | 1.650 | 21.4 | −14.60 |
| 11 | | 4.499 | ASP | 0.731 | | | | |
| 12 | Lens 6 | −419.437 | ASP | 0.591 | Plastic | 1.535 | 55.7 | −3.98 |
| 13 | | 2.143 | ASP | 0.453 | | | | |
| 14 | IR-cut filter | Plano | | 0.300 | Glass | 1.517 | 64.2 | — |
| 15 | | Plano | | 0.150 | | | | |
| 16 | Image | Plano | | — | | | | |

Note:
Reference wavelength is 587.6 nm (d-line).

TABLE 14

Aspheric Coefficients

| Surface # | 2 | 3 | 4 | 5 | 6 | 7 |
|---|---|---|---|---|---|---|
| k = | −3.1740E+00 | 3.0000E+00 | 3.0000E+00 | 1.3826E−01 | 3.0000E+00 | 3.0000E+00 |
| A4 = | 6.4951E−02 | −4.6606E−02 | −1.9018E−02 | 7.7704E−03 | −1.2211E−01 | −1.1769E−01 |
| A6 = | −2.4331E−02 | 9.6594E−02 | 2.3359E−01 | 1.4713E−01 | 5.8374E−04 | 3.3961E−03 |

TABLE 14-continued

| Aspheric Coefficients | | | | | |
|---|---|---|---|---|---|
| A8 =   1.2748E−02  | −1.5251E−01 | −4.9974E−01 | −1.7780E−01 | −2.4016E−02 | −1.6015E−02 |
| A10 =  −1.4163E−02 | 5.6618E−02  | 7.4706E−01  | 1.1828E−01  | 2.8379E−02  | 4.8342E−03  |
| A12 =  4.8236E−03  | 1.3157E−03  | −8.0258E−01 | 2.0547E−02  | −3.8708E−02 | −1.4248E−05 |
| A14 =  −6.4703E−03 | −3.3194E−03 | 5.0150E−01  | −8.2819E−02 | 8.7265E−03  | −4.4366E−04 |
| A16 =              |             | −1.2631E−01 | 4.1200E−02  |             |             |

| Surface # | 8 | 9 | 10 | 11 | 12 | 13 |
|---|---|---|---|---|---|---|
| k =   | 1.6240E+00  | −6.7322E−01 | 3.0000E+00  | −1.0000E+02 | 3.0000E+00  | −6.8251E+00 |
| A4 =  | −2.4667E−02 | 9.3151E−02  | −5.1278E−02 | −3.0657E−02 | −1.2915E−01 | −7.2058E−02 |
| A6 =  | 7.2907E−03  | −8.6316E−02 | −1.0995E−02 | −1.1315E−02 | 6.5780E−02  | 4.0540E−02  |
| A8 =  | 2.9761E−02  | 8.7766E−02  | −7.8975E−03 | 8.4854E−04  | −3.9010E−02 | −1.9183E−02 |
| A10 = | −6.6339E−03 | −2.7203E−02 | 2.0088E−03  | 3.8353E−04  | 1.4349E−02  | 6.0408E−03  |
| A12 = | −5.1756E−04 | 2.4342E−03  | −2.7503E−05 | 2.0049E−05  | −2.7392E−03 | −1.2265E−03 |
| A14 = | −9.8183E−06 | −4.5991E−05 | 4.0035E−05  | 5.3461E−06  | 2.5915E−04  | 1.5339E−04  |
| A16 = |             |             |             |             | −1.0696E−05 | −1.0697E−05 |
| A18 = |             |             |             |             | −1.5026E−07 | 3.1375E−07  |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f (mm)      | 4.42  | (R9−R10)/(R9 + R10)   | 0.32  |
| Fno         | 2.35  | (R11 + R12)/(R11−R12) | 0.99  |
| HFOV (deg.) | 33.0  | f/f3                  | −0.08 |
| (V2 + V5)/V6| 0.77  | f4/f3                 | −0.07 |
| CT3/CT4     | 1.32  | f6/f5                 | 0.27  |
| f/R3        | −0.32 | SD/TD                 | 0.95  |
| f/R6        | 0.09  | TL/ImgH               | 1.84  |

Furthermore, as shown in Table 13, when a focal length of the fifth lens element 750 is f5, a focal length of the sixth lens element 760 is f6, a curvature radius of the image-side surface 752 of the fifth lens element 750 is R10, and a curvature radius of the object-side surface 761 of the sixth lens element 760 is R11, the following relationships are satisfied: f5<f6<0; and R11<0<R10.

8th Embodiment

Figure 15:
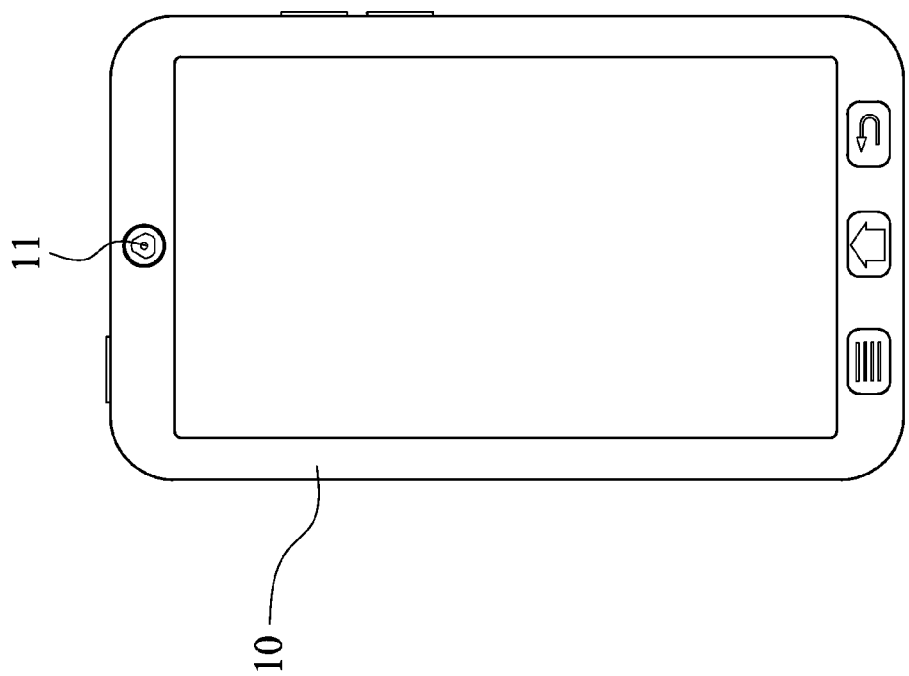
FIG. 15 is a schematic view of an electronic device according to the 8th embodiment of the present disclosure.

FIG. 15 is a schematic view of an electronic device 10 according to the 8th embodiment of the present disclosure. The electronic device 10 of the 8th embodiment is a smart phone, wherein the electronic device 10 includes an image capturing device 11. The image capturing device 11 includes a photographing optical lens (not shown herein) according to the present disclosure and an image sensor (not shown herein), wherein the image sensor is disposed on or near an image surface of the photographing optical lens.

9th Embodiment

Figure 16:
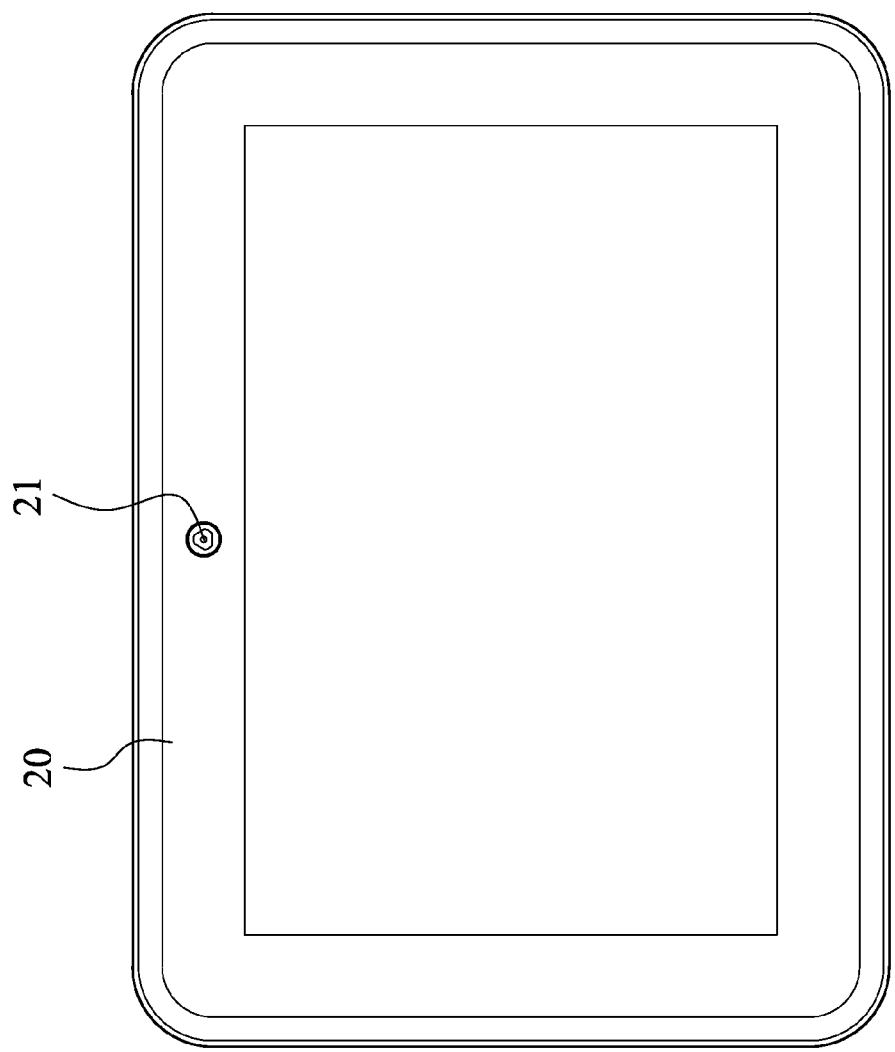
FIG. 16 is a schematic view of an electronic device according to the 9th embodiment of the present disclosure.

FIG. 16 is a schematic view of an electronic device 20 according to the 9th embodiment of the present disclosure. The electronic device 20 of the 9th embodiment is a tablet personal computer, wherein the electronic device 20 includes an image capturing device 21. The image capturing device 21 includes a photographing optical lens (not shown herein) according to the present disclosure and an image sensor (not shown herein), wherein the image sensor is disposed on or near an image surface of the photographing optical lens.

10th Embodiment

Figure 17:
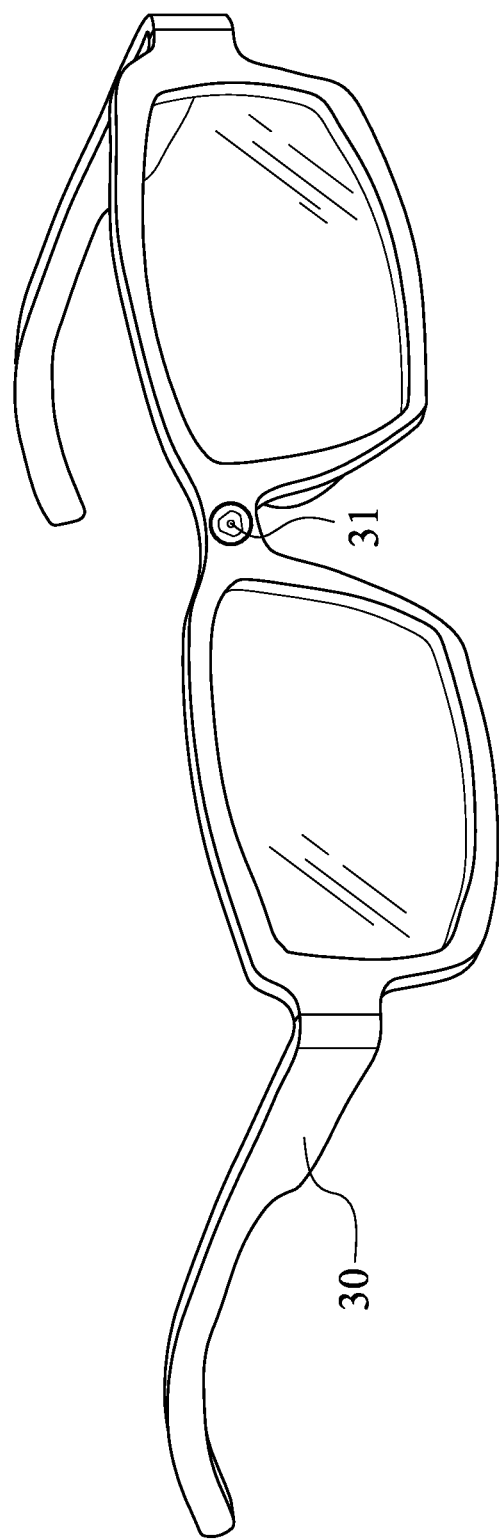
FIG. 17 is a schematic view of an electronic device according to the 10th embodiment of the present disclosure.

FIG. 17 is a schematic view of an electronic device 30 according to the 10th embodiment of the present disclosure. The electronic device 30 of the 10th embodiment is a head-mounted display, wherein the electronic device 30 includes an image capturing device 31. The image capturing device 31 includes a photographing optical lens (not shown herein) according to the present disclosure and an image sensor (not shown herein), wherein the image sensor is disposed on or near an image surface of the photographing optical lens.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A photographing optical lens comprising, in order from an object side to an image side:
   a first lens element having positive refractive power;
   a second lens element;
   a third lens element having an image-side surface being convex in a paraxial region thereof, wherein a curvature of the image-side surface of the third lens element is greater than a curvature of an object-side surface of the third lens element;
   a fourth lens element;
   a fifth lens element with negative refractive power having an image-side surface being concave in a paraxial region thereof, wherein an object-side surface and the image-side surface of the fifth lens element are aspheric; and
   a sixth lens element with negative refractive power having an object-side surface being concave in a paraxial region thereof and an image-side surface being concave in a paraxial region thereof, wherein the object-side surface and the image-side surface of the sixth lens element are aspheric, and the image-side surface of the sixth lens element has at least one inflection point;
   wherein the photographing optical lens has a total of six lens elements, the photographing optical lens further comprises a stop, the stop is located between an object and the second lens element, a focal length of the photographing optical lens is f, a focal length of the fifth lens element is f5, a focal length of the sixth lens element is f6, a curvature radius of the image-side surface of the third lens element is R6, a curvature radius of the image-side surface of the fifth lens element is R10, a curvature radius of the object-side surface of the sixth lens element is R11, and the following relationships are satisfied:

$f5 < f6 < 0;$ $R11 < 0 < R10;$ and $-2.0 < f/R6 < 0.60.$

2. The photographing optical lens of claim 1, wherein the second lens element has negative refractive power.

3. The photographing optical lens of claim 2, wherein the second lens element has an image-side surface being concave in a paraxial region thereof.

4. The photographing optical lens of claim 3, wherein an axial distance between the stop and the image-side surface of the sixth lens element is SD, an axial distance between an object-side surface of the first lens element and the image-side surface of the sixth lens element is TD, and the following relationship is satisfied:

$0.85 < SD/TD < 1.2.$

5. The photographing optical lens of claim 4, wherein the second lens element has an object-side surface being convex in a paraxial region thereof.

6. The photographing optical lens of claim 4, wherein a curvature radius of the object-side surface of the fifth lens element is R9, the curvature radius of the image-side surface of the fifth lens element is R10, and the following relationship is satisfied:

$0 < (R9-R10)/(R9+R10) < 2.0.$

7. The photographing optical lens of claim 1, wherein the image-side surface of the fifth lens element has at least one convex shape in an off-axis region thereof.

8. The photographing optical lens of claim 7, wherein the focal length of the fifth lens element is f5, the focal length of the sixth lens element is f6, and the following relationship is satisfied:

$0.05 < f6/f5 < 0.60.$

9. The photographing optical lens of claim 1, wherein the focal length of the photographing optical lens is f, the curvature radius of the image-side surface of the third lens element is R6, and the following relationship is satisfied:

$-2.0 < f/R6 < -0.45.$

10. The photographing optical lens of claim 1, wherein the fourth lens element has positive refractive power, a focal length of the third lens element is f3, a focal length of the fourth lens element is f4, and the following relationship is satisfied:

$-1.0 < f4/f3 < 1.0.$

11. The photographing optical lens of claim 1, wherein the focal length of the photographing optical lens is f, a curvature radius of an object-side surface of the second lens element is R3, and the following relationship is satisfied:

$0.15 < f/R3.$

12. The photographing optical lens of claim 1, wherein the negative refractive power of the sixth lens element is stronger than the negative refractive power of other lens elements with negative refractive power of the photographing optical lens.

13. The photographing optical lens of claim 1, wherein an axial distance between an object-side surface of the first lens element and an image surface is TL, a maximum image height of the photographing optical lens is ImgH, and the following relationship is satisfied:

$TL/ImgH < 1.90.$

14. A photographing optical lens comprising, in order from an object side to an image side:
 a first lens element having positive refractive power;
 a second lens element;
 a third lens element;
 a fourth lens element;
 a fifth lens element with negative refractive power having an image-side surface being concave in a paraxial region thereof, wherein an object-side surface and the image-side surface of the fifth lens element are aspheric; and
 a sixth lens element with negative refractive power having an object-side surface being concave in a paraxial region thereof and an image-side surface being concave in a paraxial region thereof, wherein the object-side surface and the image-side surface of the sixth lens element are aspheric, and the image-side surface of the sixth lens element has at least one inflection point;
 wherein a central thickness of the third lens element is greater than an axial distance between an image-side surface of the third lens element and an object-side surface of the fourth lens element;
 wherein each of the first lens element, the second lens element, the third lens element, the fourth lens element, the fifth lens element and the sixth lens element is a single and non-cemented lens element;
 wherein the photographing optical lens has a total of six lens elements, a focal length of the photographing optical lens is f, a focal length of the fifth lens element is f5, a focal length of the sixth lens element is f6, a curvature radius of an object-side surface of the second lens element is R3, a curvature radius of the image-side surface of the fifth lens element is R10, a curvature radius of the object-side surface of the sixth lens element is R11, a curvature radius of the image-side surface of the sixth lens element is R12, and the following relationships are satisfied:

$f5 < f6 < 0;$ $R11 < 0 < R10;$ $-0.45 < f/R3;$ and $-0.30 < (R11+R12)/(R11-R12) < 1.0.$ 15. The photographing optical lens of claim 14, wherein the second lens element has negative refractive power.

16. The photographing optical lens of claim 15, wherein the fourth lens element has positive refractive power.

17. The photographing optical lens of claim 16, wherein a focal length of the third lens element is f3, a focal length of the fourth lens element is f4, and the following relationship is satisfied:

$-1.0 < f4/f3 < 1.0.$

18. The photographing optical lens of claim 17, wherein the second lens element has an image-side surface being concave in a paraxial region thereof.

19. The photographing optical lens of claim 17, wherein the fourth lens element has an image-side surface being convex in a paraxial region thereof.

20. The photographing optical lens of claim 17, wherein the third lens element has positive refractive power.

21. The photographing optical lens of claim 14, wherein an Abbe number of the second lens element is V2, an Abbe number of the fifth lens element is V5, an Abbe number of the sixth lens element is V6, and the following relationship is satisfied:

$0.40<(V2+V5)/V6<0.90.$

22. The photographing optical lens of claim 14, wherein the focal length of the photographing optical lens is f, a focal length of the third lens element is f3, and the following relationship is satisfied:

$0.35<f/f3.$

23. The photographing optical lens of claim 14, wherein the central thickness of the third lens element is CT3, a central thickness of the fourth lens element is CT4, and the following relationship is satisfied:

$0.80<CT3/CT4.$

24. The photographing optical lens of claim 14, wherein the focal length of the photographing optical lens is f, a curvature radius of the image-side surface of the third lens element is R6, and the following relationship is satisfied:

$-2.0<f/R6<-0.45.$

25. The photographing optical lens of claim 14, wherein the curvature radius of the object-side surface of the sixth lens element is R11, the curvature radius of the image-side surface of the sixth lens element is R12, and the following relationship is satisfied:

$0<(R11+R12)/(R11-R12)<1.0.$

26. The photographing optical lens of claim 25, wherein the fourth lens element has the object-side surface being concave in a paraxial region thereof.

27. The photographing optical lens of claim 25, wherein the fifth lens element has the object-side surface being convex in a paraxial region thereof.

28. An image capturing device, comprising:
the photographing optical lens of claim 14; and
an image sensor located at the image side of the photographing optical lens.

29. An electronic device, comprising:
the image capturing device of claim 28.

30. The photographing optical lens of claim 14, wherein the first lens element has an image-side surface being convex in a paraxial region thereof.

31. The photographing optical lens of claim 14, wherein a focal length of the first lens element is f1, a focal length of the fourth lens element is f4, and the following relationship is satisfied:

$f1<f4.$

* * * * *